(12) United States Patent
Mercier et al.

(10) Patent No.: US 11,203,677 B2
(45) Date of Patent: Dec. 21, 2021

(54) RESILIENT SURFACE COVERINGS AND METHODS OF MAKING AND USING THEREOF

(71) Applicant: AMERICAN BILTRITE (CANADA) LTD., Sherbrooke (CA)

(72) Inventors: Jean-Claude Mercier, Sherbrooke (CA); Alexandre Proulx, Sherbrooke (CA); Olivier Gagnon, Sherbrooke (CA)

(73) Assignee: AMERICAN BILTRITE (CANADA) LTD., Sherbrooke (CA)

(*) Notice: Subject to any disclaimer, the term of this patent is extended or adjusted under 35 U.S.C. 154(b) by 0 days.

(21) Appl. No.: 16/146,449

(22) Filed: Sep. 28, 2018

(65) Prior Publication Data

US 2019/0136002 A1    May 9, 2019

Related U.S. Application Data

(60) Provisional application No. 62/581,121, filed on Nov. 3, 2017.

(51) Int. Cl.
*B29C 71/02* (2006.01)
*E04F 15/10* (2006.01)
(Continued)

(52) U.S. Cl.
CPC ............... *C08J 7/08* (2013.01); *B29C 43/24* (2013.01); *B29C 59/005* (2013.01);
(Continued)

(58) Field of Classification Search
CPC ........................... C08J 7/08; B29K 2009/06
See application file for complete search history.

(56) References Cited

U.S. PATENT DOCUMENTS 3,153,684 A * 10/1964 William ............. B05D 3/08
                                                 156/497
3,899,378 A    8/1975 Wragg et al.
(Continued)

FOREIGN PATENT DOCUMENTS

AU    2017100805 A4    8/2017
CA       2155325 A1    9/1994
(Continued)

OTHER PUBLICATIONS

Feng Lin—CN101096440 A—MT—SEBS thermoplastic elastomer floor—2007 (Year: 2007).*
(Continued)

*Primary Examiner* — Callie E Shosho
*Assistant Examiner* — John Vincent Lawler
(74) *Attorney, Agent, or Firm* — Choate, Hall & Stewart LLP; Brenda Herschbach Jarrell; Dana M. Daukss

(57) ABSTRACT

The present disclosure provides, among other things, surface coverings with a protective coat applied thereto a rubber material. As provided herein, in some embodiments, a surface covering has or includes an exposed surface that is no-wax. The present disclosure further provides methods of making, and methods of using. Such surface coverings have surprising and beneficial attributes. They are particularly advantageous as resistant to soiling and abrasion. These surface covering are also resistant to crumbling under load. Such surface coverings would be useful as flooring products with desirable properties. In particular, such abrasion and soil resistant surfaces could be useful as a rubber flooring product.

27 Claims, 12 Drawing Sheets

(51) Int. Cl.
| | |
|---|---|
| *C08J 7/04* | (2020.01) |
| *C08J 7/043* | (2020.01) |
| *C08J 7/046* | (2020.01) |
| *B29C 43/24* | (2006.01) |
| *B29C 59/00* | (2006.01) |
| *B29C 69/00* | (2006.01) |
| *B32B 37/24* | (2006.01) |
| *B29K 9/06* | (2006.01) |
| *B29K 19/00* | (2006.01) |

(52) U.S. Cl.
CPC ............ *B29C 69/001* (2013.01); *C08J 7/043* (2020.01); *C08J 7/046* (2020.01); *C08J 7/0427* (2020.01); *E04F 15/10* (2013.01); *E04F 15/105* (2013.01); *B29K 2009/06* (2013.01); *B29K 2019/00* (2013.01); *B32B 2037/243* (2013.01); *B32B 2255/10* (2013.01); *B32B 2310/0445* (2013.01); *B32B 2419/04* (2013.01); *C08J 2309/06* (2013.01); *C08J 2313/00* (2013.01); *C08J 2319/00* (2013.01); *C08J 2321/00* (2013.01); *C08J 2433/08* (2013.01); *C08J 2475/04* (2013.01); *E04F 2290/04* (2013.01)

(56) References Cited

U.S. PATENT DOCUMENTS

| | | | |
|---|---|---|---|
| 3,935,329 A | 1/1976 | Reilly et al. | |
| 4,097,439 A * | 6/1978 | Darling | C08F 299/06 |
| | | | 522/97 |
| 5,217,554 A | 6/1993 | Stroppiana | |
| 5,523,356 A | 6/1996 | Aldrovandi et al. | |
| 5,753,754 A * | 5/1998 | Strobel | B29C 59/08 |
| | | | 525/61 |
| 5,899,038 A | 5/1999 | Stroppiana | |
| 6,303,554 B1 | 10/2001 | Casati et al. | |
| 6,418,691 B1 | 7/2002 | Stroppiana | |
| 6,793,760 B2 | 9/2004 | Hoffmann et al. | |
| 7,279,532 B2 | 10/2007 | Sasagawa et al. | |
| 7,354,963 B2 | 4/2008 | Stroppiana | |
| 7,585,555 B2 | 9/2009 | Stroppiana | |
| 7,632,444 B2 | 12/2009 | Stroppiana | |
| 7,741,408 B2 * | 6/2010 | Walther | C08L 23/0815 |
| | | | 525/192 |
| 7,814,728 B2 | 10/2010 | Stroppiana | |
| 7,935,429 B2 | 5/2011 | Park et al. | |
| 8,221,856 B2 | 7/2012 | Stroppiana | |
| 8,586,661 B2 | 11/2013 | Mercier et al. | |
| 8,592,501 B2 | 11/2013 | Phan et al. | |
| 8,631,631 B2 | 1/2014 | Vanderbilt et al. | |
| 9,303,412 B2 | 4/2016 | Grun et al. | |
| 9,447,588 B2 | 9/2016 | Kroeger et al. | |
| 10,113,042 B2 * | 10/2018 | Gedan-Smolka | C08J 7/123 |
| 2004/0039128 A1 | 2/2004 | Sasagawa et al. | |
| 2004/0247899 A1 * | 12/2004 | Bier | C08J 7/056 |
| | | | 428/447 |
| 2006/0024453 A1 * | 2/2006 | Setser | B29B 17/0042 |
| | | | 428/2 |
| 2006/0189759 A1 | 8/2006 | Walther et al. | |
| 2006/0249251 A1 | 11/2006 | Parolini | |
| 2007/0048457 A1 * | 3/2007 | Ando | C08J 5/18 |
| | | | 428/1.1 |
| 2008/0053335 A1 * | 3/2008 | Gustafsson | C09D 121/00 |
| | | | 106/241 |
| 2008/0146737 A1 | 6/2008 | Ashiura et al. | |
| 2008/0206583 A1 | 8/2008 | Phan et al. | |
| 2012/0252954 A1 | 10/2012 | Grun et al. | |
| 2012/0277365 A1 | 11/2012 | Mercier et al. | |
| 2013/0150518 A1 | 6/2013 | Grun et al. | |
| 2013/0210303 A1 | 8/2013 | Doi et al. | |
| 2014/0043237 A1 | 2/2014 | Trobrillant | |
| 2016/0031135 A1 | 2/2016 | Hicks et al. | |
| 2016/0297132 A1 | 10/2016 | Rischer et al. | |
| 2016/0369209 A1 | 12/2016 | Fuchs et al. | |
| 2016/0369210 A1 | 12/2016 | Fuchs et al. | |

FOREIGN PATENT DOCUMENTS

| | | | | |
|---|---|---|---|---|
| CA | 2155625 A1 | 3/1996 | | |
| CA | 1339286 C | 8/1997 | | |
| CA | 2520393 A1 | 10/2004 | | |
| CN | 101096440 * | 1/2008 | ............ | B29C 47/06 |
| EP | 1361249 B1 * | 8/2006 | ............ | C08L 29/14 |
| JP | H01-259047 A | 10/1989 | | |
| JP | H22-40149 A | 9/1990 | | |
| JP | 2008-115659 A | 5/2008 | | |
| JP | 2008-247973 A | 10/2008 | | |
| WO | WO-97/00288 A1 | 1/1997 | | |
| WO | WO-2004/087804 A1 | 10/2004 | | |
| WO | WO-2012/017235 A1 | 2/2012 | | |
| WO | WO-2012/145844 A1 | 11/2012 | | |
| WO | WO216113377 * | 7/2016 | ............... | C08K 3/34 |
| WO | WO-2017/009066 A1 | 1/2017 | | |

OTHER PUBLICATIONS

Surface tension—other_polymers (Year: 2009).*
Farris—flame treatment of polyolefins—Polymer—2010 (Year: 2010).*
Synthesia International—Polyurethane density—2012 (Year: 2012).*
MAZZOLA-2014-846305-NPL (Year: 2014).*
EPDM Rubber Sheet (Black 60 Duro) TDS—Dated 2017 (Year: 2017).*
Ho and Khew—Surface energy of natural rubber latex—Langmuir—2000 (Year: 2000).*
Alconox—How to Clean Mold Release Agent from HDPE parts_—TechNotes—Aug. 2017 (Year: 2017).*
Preparing Plastics for Painting _Adhesion Bonding—2012 (Year: 2012).*
Adhesion_ How to ensure it with hard-to-bond plastic substrates (Year: 2017).*
MatWeb—Dow Engage 8440 Polyolefin Elastomer—ethylene-1-octene—Density+Elong—2020 (Year: 2020).*
Hara—Ionomer blends—Kor.J.Chem.Eng.—Ionomer-EPDM blends—1998 (Year: 1998).*
Ethylene-Propylene-Rubbers-e28093-Properties-and-Applications-of-Ethylene-Propylene-Diene-(EPDM)-and-Ethylene-Propylene-Copolymers-(EPM) (Year: 2003).*
UL Prospector—Polyurethane (PUR) Typical Properties Generic PUR, Unspecified—Feb. 2021 (Year: 2021).*
Air—Molecular Weight and Composition—Eng.ToolBox—May 3, 2021 (Year: 2021).*
Methane _ CH4—PubChem (Year: 2021).*
Farris, S. et al., The fundamentals of flame treatment for the surface activation of polyolefin polymers—a review, Polymer 51, 3591-3605 (2010).
International Search Report for PCT/CA2012/050261 (Surface Covering Materials and Products, filed Apr. 25, 2012), issued by ISA/CA, 4 pages (dated Jul. 23, 2012).
Written Opinion for PCT/CA2012/050261 (Surface Covering Materials and Products, filed Apr. 25, 2012), issued by ISA/CA, 6 pages (dated Jul. 23, 2012).
International Search Report for PCT/IB2018/057583 (Resilient Surface Coverings and Methods of Making and Using Thereof, filed Sep. 28, 2018), issued by ISA/CA. 3 pages (dated Feb. 19, 2019).
Standard Specification for Rubber Floor Tile, ASTM International, Designation: F1344-15, 4 pages (2015).
Written Opinion for PCT/IB2018/057583 (Resilient Surface Coverings and Methods of Making and Using Thereof, filed Sep. 28, 2018), issued by ISA/CA. 6 pages (dated Feb. 19, 2019).
Technical Specifications Sheet Massetto (3MM), Section 096516.33 Rubber Sheet Flooring and/or Section 096519.33 Rubber Tile Flooring. (https://mondocontractflooring.com/wp-content/uploads/2017/06/Spec-Sheet-MASSETTO.pdf).

* cited by examiner (a) (b)

(a)

(b)

RESILIENT SURFACE COVERINGS AND METHODS OF MAKING AND USING THEREOF

BACKGROUND

Rubber flooring offers a multitude of benefits as a surface coverings, including for example elasticity and resiliency. In recent years, materials have been designed and engineered to be more resistant to both exposure and wear. Such resilient rubber surface coverings are typically coated with a thin protective layer. These protective layers of coating are applied to a prepared surface to enhance aesthetics of a surface, for example a design or a gloss or provide enhanced resiliency, such as abrasion resistance.

SUMMARY

The present disclosure provides surface coverings and methods of making and using surface coverings. The present disclosure further provides an insight that some compositions, combinations, and methods are useful in making surface coverings. The present disclosure encompasses a recognition that employing such coatings and methods together produces surface coverings with surprising and beneficial attributes.

In some embodiments, surface coverings as disclosed herein are successfully utilized, for example, as flooring products. In some embodiments, surface coverings as provided herein are no-wax are flooring products that do not require initial maintenance, for example, initial buffing or waxing. In some embodiments, surface coverings as disclosed herein that are no-wax are flooring products that do not require routine maintenance, for example, buffing or waxing.

The present disclosure provides surface coverings. In some embodiments, surface coverings as disclosed herein are characterized by their ability to resist soiling even after prolonged normal use. In some embodiments, surface coverings as disclosed herein are characterized by their ability to be cleaned with water and wiping, such as wet mopping. In some embodiments, surface coverings as disclosed herein are characterized by their ability to be cleaned with water with a mild detergent and wiping, such as wet mopping. In some embodiments, surface coverings as disclosed herein are no-wax. In some embodiments, surface coverings as provided herein are characterized in that they do not need to be waxed after installation on-site. In some embodiments, surface coverings as disclosed herein are characterized by their ability to resist abrasion, breaking, cracking, crumbling, dents, fading (e.g. color fading), mars, peeling, scuffing, scratching, and/or wear, for example, even after prolonged normal use or extreme use. In some embodiments, surface coverings as disclosed herein are further characterized by their ability to resist such abrasion and crumbling mentioned above while achieving and retaining desired flexibility. In some embodiments, provided surface coverings with at least one of the above mentioned attributes were successfully manufactured. In some embodiments, provided surface coverings with all of the above mentioned attributes were successfully manufactured.

The present disclosure also provides methods of preparing such surface coverings. In some embodiments, methods of making surface coverings and such surface coverings as provided herein are particularly useful as resistant or resilient surface coverings in applications, for example, rubber mats, rolled rubber, molded rubber tile, etc. Implementations of surface coverings of the present disclosure are useful for a wide range of surface covering applications, including but not limited to: flooring, walls, countertops, furniture, etc., for example in commercial or industrial sites, sporting venues, gyms, laundry areas, and a variety of other residential applications.

In some embodiments, provided surface coverings are no-wax. In some embodiments, provided surface coverings do not need to be waxed after installation on-site. In some embodiments, provided surface coverings following installation do not require any preventative maintenance or treatment. In some embodiments, provided surface coverings following installation do not receive a wax or other commercially available protectant. In some embodiments, provided surface coverings following installation do not need or want a wax or other commercially available protectant applied to them.

In some embodiments, provided surface coverings only require periodic cleaning. In some embodiments, a cleaned surface covering appears substantially similar to a new surface covering. In some embodiments, following prolonged normal to hard use, a cleaned surface covering appears substantially similar to a new surface covering. In some embodiments, following prolonged normal to hard use, a cleaned surface covering that was utilized as a floor covering appears substantially similar to a new surface covering. In some embodiments, following prolonged normal to hard use and repeated cleaning cycles, a cleaned surface covering appears substantially similar to a new surface covering.

In some embodiments, provided surface coverings do not require any regular maintenance or treatment to prolong their use. In some embodiments, provided surface coverings including a base and a protective coat are useful as surface coverings because such surface coverings are characterized in that they are resistant to soiling even after prolonged normal use. In some embodiments, provided surface coverings following installation are cleanable. In some embodiments, provided surface coverings following installation that are cleanable are characterized by their ability to be cleaned with water and wiping, such as wet mopping.

In some embodiments, provided surface coverings are cleanable and appear new following repetitive exposure to cycles of soiling and cleaning. In some embodiments, exposure is or includes cycles of soiling and cleaning that mimics or exceeds extreme regular wear and/or use of provided surface coverings when they are used as flooring. In some embodiments, provided surface coverings are characterized in that they are resistant to such repetitive exposure to repetitive cycles of soiling and cleaning. In some embodiments, provided surface coverings are characterized by their ability to be cleaned with water and wiping, such as wet mopping between soiling in repetitive cycles. In some embodiments, provided surface coverings are characterized by their ability to be cleaned with water and wiping, such as wet mopping between soiling in repetitive cycles without application of a wax coat before or in-between cycles.

In some embodiments, provided surface coverings are substantially free of soiling following exposure to prolonged normal wear or hard use. In some embodiments, surface coverings as provided herein are substantially clean and substantially free of soiling after repetitive soiling and cleaning cycles.

In some embodiments, exposure to soiling is or includes, for example, a blend of clay, carbon black, and pigments. In some embodiments, soiling is or includes exposing a no-wax surface of a surface covering to soiling. In some embodiments, soiling a no-wax surface of a surface covering is or includes, for example, a blend of clay, carbon black, and pigments that is ground into a top layer of a surface covering.

In some embodiments, provided surface coverings that are soiled or dirtied are cleanable. In some embodiments, provided surface coverings that are soiled as disclosed are cleanable, for example, with water, a mild detergent, and wiping. In some embodiments, wiping is, for example, rubbing a surface with a cloth or wet mopping.

In some embodiments, cleaning a soiled no-wax surface of a surface covering as provided herein is or includes cleaning with a rotary cleaning machine having standard green scouring pads. In some embodiments, cleaning with a rotary cleaning machine is or includes operating such a machine on an exposed surface of a surface covering, that is a soiled no-wax surface at 300 rpm for 2 minutes. In some embodiments, surface coverings as provided herein are substantially clean after they are exposed to at least 20 cycles of such soiling and cleaning. In some embodiments, surface coverings as provided herein are substantially clean after they are exposed to at least 30 cycles of such soiling and cleaning. In some embodiments, surface coverings as provided herein are substantially clean after they are exposed to at least 50 cycles of such soiling and cleaning.

In some embodiments, provided surface coverings are characterized in that they are abrasion resistant. In some embodiments, provided surface coverings are useful as surface coverings because such surface coverings and/or exposed surfaces thereof are characterized in that they are resistant to abrasion, cracks, dents, fading (e.g. color fading), mars, peeling, scuffing, scratching, and/or wear, for example, even after prolonged normal or extreme use. In some embodiments, prolonged normal use, for example, is or includes at least a year or more.

In some embodiments, surface coverings as provided herein are substantially free of abrasion, mars, peeling, scuffing, scratching, and/or wear after a rotary cleaning machine having standard red or green scouring pads is operated on a no-wax surface of a surface covering at 300 rpm for 2 minutes. In some embodiments, surface coverings as provided herein are substantially free of abrasion, mars, peeling, scuffing, scratching, and/or wear after a rotary cleaning machine having standard red or green scouring pads is operated on a no-wax surface covering of a surface covering for at least 200 minutes.

In some embodiments, a no-wax surface of provided surface coverings is substantially free of abrasion, cracking, mars, peeling, scuffing, scratching, and/or wear following repetitive soiling and cleaning cycles as above disclosed. In some embodiments, a soiled no-wax surface of a surface covering includes a blend of clay, carbon black, and pigments ground into it followed by cleaning with a rotary cleaning machine having standard green scouring pads. In some embodiments, cleaning with a rotary cleaning machine is or includes operating such a machine on a no-wax surface of a surface covering at 300 rpm for 2 minutes. In some embodiments, surface coverings as provided herein are substantially clean and substantially free of abrasion after they are exposed to at least 20 cycles of such soiling and cleaning. In some embodiments, surface coverings as provided herein are substantially clean and substantially free of abrasion after they are exposed to at least 30 cycles of such soiling and cleaning. In some embodiments, surface coverings as provided herein are substantially clean and substantially free of abrasion after they are exposed to at least 50 cycles of such soiling and cleaning. In some embodiments, provided surface coverings are substantially free of abrasion, cracking, mars, peeling, scuffing, scratching, and/or wear following such repetitive soiling and cleaning.

In some embodiments, a no-wax surface of provided surface coverings is substantially free of abrasion, cracking, mars, peeling, scuffing, scratching, and/or wear following extreme abrasion. In some embodiments, a no-wax surface of provided surface coverings is substantially free of abrasion, cracking, mars, peeling, scuffing, scratching, and/or wear following abrasion from a rotary cleaning machine having black abrasive pads operating at 300 rpm for 2 minutes.

In some embodiments, provided surface coverings are characterized in that they are flexible, such that they stretch. In some embodiments, provided surface coverings that are flexible are further characterized by their resistance breaking and/or crumbling under compression. In some embodiments, provided surface coverings that are flexible are further characterized by their resistance breaking and/or crumbling under compression with lateral movement. In some embodiments, when provided surface coverings are adhered to a substrate, such as a sub-floor, and exposed to such compression with lateral movement, they exhibit flexibility and resistance breaking and/or crumbling.

In some embodiments, when used as flooring, surface coverings as provided herein are flexible and resistant to breaking and/or crumbling. In some embodiments, surface coverings as provide herein are characterized in that when a standard hospital bed caster holding at least 400 lbs is mounted on top of a no-wax surface of a surface covering and travels in a path pivoting on itself for a least 1000 cycles, such a surface covering is resistant to breaking, bubbling, cracking and/or crumbling. In some embodiments, surface coverings as provide herein are characterized in that when a standard hospital bed caster holding at least 400 lbs is mounted on top of a no-wax surface of a surface covering and travels in a path pivoting on itself for a least 1000 cycles, such a surface covering is substantially free of breaking, bubbling, cracking and/or crumbling. In some embodiments, when adhered and/or laminated to a substrate such as a sub-floor and exposed to the compression and lateral movement of a standard hospital bed caster as above disclosed, a surface covering is resistant to breaking, bubbling, cracking and/or crumbling. In some embodiments, when adhered and/or laminated to a substrate such as a sub-floor and exposed to the compression and lateral movement of a standard hospital bed caster as above disclosed, a surface covering is substantially free of breaking, bubbling, cracking and/or crumbling.

In some embodiments, when provided surface coverings are adhered to a substrate, such as a sub-floor, and exposed to such compression with lateral movement, they exhibit both desirable flexibility and resistance breaking and/or crumbling.

In some embodiments, provided surface coverings are characterized in that when a mandrel of at least 1 inch OD is pressed onto an exposed surface of a surface covering, a no-wax surface according to ASTM F137, its no-wax surface is substantially free of cracks.

In some embodiments, surface coverings are characterized by an elongation. In some embodiments, provided surface coverings are characterized by an elongation of about 95% ASTM D412.

In some embodiments, surface coverings are characterized by a tensile strength. In some embodiments, surface coverings are characterized by a tensile strength of about 6.2 MPa ASTM D412.

In some embodiments, surface coverings are characterized by a tear strength. In some embodiments, surface coverings are characterized by a tear strength of about 190 lb/in ASTM D624.

In some embodiments, surface coverings are characterized by a Taber abrasion value. In some embodiments, surface coverings are characterized by a Taber abrasion of less than about 150 mg per 1000 revolutions.

In some embodiments, surface coverings are characterized by a Shore A hardness. In some embodiments, surface coverings are characterized by a Shore A hardness of about 95 ASM D2240.

In some embodiments, surface coverings are characterized by a thermal stability. In some embodiments, surface coverings are characterized by a thermal stability of ΔE less than 5 ASTM F1514.

In some embodiments, surface coverings are characterized by a light stability. In some embodiments, surface coverings are characterized by a light stability of ΔE less than 5 ASTM F1515.

In some embodiments, surface coverings are characterized by a ΔE. In some embodiments, surface coverings are characterized by a ΔE of less than 5 following Xenon arc exposure for at least 400 hours. In some embodiments, surface coverings are characterized by an average ΔE in a range of about 1 to about 5 when light resistance is measured by spectrophotometer after aging at the temperature of 145° F. for 300 hours.

In some embodiments, surface coverings are engineered and/or fabricated from compositions and/or materials. In some embodiments, provided surface coverings are or include at least one layer. In some embodiments, compositions and/or materials are or include one or more layers that may be stacked on one another. In some embodiments, provided surface coverings are or include multiple individual layers.

In some embodiments, provided surface coverings include a base having a protective coat adhered thereto.

In some embodiments, a base provides structural stability to a surface covering. In some embodiments, a base as provided herein is a supplied product. In some embodiments, a base a provided herein is made or manufactured. In some embodiments, a base has or includes multiple individual layers. In some embodiments, a base has or includes multiple individual layers stacked on top of one another. In some embodiments, a base has a thickness in a range from: about 1.5 mm to 10 mm. In some embodiments, surface coverings provided herein have a thickness of about 3 mm. In some embodiments, a base is about 95% to about 99% of a surface covering's thickness. In some embodiments, a base is about 98% to about 99% of a surface covering's thickness. In some embodiments, a base of provided surface coverings is resistant to heat and light. In some embodiments, a base is substantially resistant to change associated with exposure to heat. In some embodiments, a base is substantially resistant to change associated with exposure to light.

In some embodiments, a base is or includes a rubber material. In some embodiments, a rubber material is or includes a polymer and/or a polymer mixture. In some embodiments, a rubber material is or includes an acid copolymer; an acrylate copolymer; a butyl rubber; a copolymer; an elastomer; an ethylene-acrylic rubber; an ethylene-propylene rubber; an ethylene-propylene-diene rubber; an ethylene-octene copolymer; a styrene-butadiene copolymer; an ionomer; a low density polyethylene; a polybutene; a polyethylene; a polymer; a polymethylpentene; a polypropylene; a styrene-acrylate copolymer; a styrene-methylacrylate block copolymer; a styrene-polyolefin block copolymer; a thermoplastic; a thermoplastic polyolefin; a terpolymer; a thermoplastic polyurethane; and combinations, mixtures, or blends thereof. In some embodiments, a rubber material is characterized by its density. In some embodiments, a rubber material is characterized by a density in a range of about 0.8 $g/cm^3$ to about 1.9 $g/cm^3$.

In some embodiments, a rubber material is about 15% to about 95% by weight of a base. In some embodiments, a rubber material is about 50% by weight of a base. In some embodiments, a base includes a binder. In some embodiments, a binder includes: a polymer, a tackifier, rheology modifiers, and/or plasticizers. In some embodiments, a binder includes additives. In some embodiments, a binder includes flow agents. In some embodiments, a binder includes stabilizers. In some embodiments, a base includes one or more pigments. In some embodiments, pigments provide desired shading or coloring for a base. In some embodiments, pigments include, for example: titanium dioxide, iron oxide, etc. In some embodiments, a base includes one or more fillers. In some embodiments, fillers are or include calcium carbonate, limestone, dolomite, amorphous silica, clay, recycled materials (e.g., dry wall dust), or combinations thereof.

In some embodiments, a surface covering includes a base and a protective coat applied and/or adhered thereto. In some embodiments, a protective coat is or includes a material useful as a "no-wax finish". In some embodiments, a protective coat is or includes at least one layer or multiple layers of a protective coat stacked on one another. In some embodiments, a protective coat has an application weight of about 15 $g/m^2$ to about 50 $g/m^2$. In some embodiments, a protective coat is configured to provide a glossy aesthetic. In some embodiments, a glossy aesthetic is configured to have a flat appearance. In some embodiments, a glossy aesthetic is configured to have a high gloss appearance. In some embodiments, a glossy aesthetic is configured to have a semi-gloss appearance. In some embodiments, a protective coat is designed to have a 60° gloss value of about 3 to about 40.

In some embodiments, a protective coat is or includes polyurethane, polyacrylic, and blends or mixtures thereof. In some embodiments, a protective coat is insoluble in water. In some embodiments, a protective coat is clear. In some embodiments, a protective coat is cured or curable. In some embodiments, a protective coat is UV cured or curable.

In some embodiments, a protective coat is adhered to a base. In some embodiments, a protective coat exhibits adhesion to a base. In some embodiments, an interface between a base and a protective coat is or includes crosslinks. In some embodiments, provided surface coverings have or include crosslinks between a base and a protective coat. In some embodiments, a protective coat is crosslinked with a base. In some embodiments, a protective coat is applied such that it adheres to a base.

In some embodiments, provided surface coverings are a rolled product or a product that can be rolled for storage. In some embodiments, provided surface coverings are a rolled product that can be installed by rolling out. In some embodiments, provided surface coverings are a tile product. In some embodiments, provided surface coverings are a molded tile product.

In some embodiments, the present disclosure includes methods of manufacturing surface coverings as disclosed herein.

In some embodiments, provided methods of manufacturing include providing a base, preparing a base for a protective coat, and applying a protective coat.

In some embodiments, methods of manufacturing include a step of providing of a base. In some embodiments, a base is or includes a rubber material. In some embodiments, a rubber material is or includes a polymer and/or a polymer mixture. In some embodiments, a step of providing a base includes steps of mixing a base, including a rubber material as disclosed herein at elevated temperature. In some embodiments, a step of providing a base further includes calendering a melted rubber material into a web.

In some embodiments, methods of providing a base further include forming a sheet out of a web that is sized according to its use. In some embodiments, methods of providing a base further include a step of punching a section out of a web. In some embodiments, a punched section has a desired shape. In some embodiments, methods of providing a base further include a step of punching a tile out of a web. In some embodiments, methods of providing a base further include forming a design or pattern therein or thereon.

In some embodiments, a step of providing a base includes a step of molding a rubber material. In some embodiments, a step of providing a base includes a step of molding a rubber material into a tile. In some embodiments, a step of providing a base includes a step of embossing or depressing a rubber material. In some embodiments, a step of providing a base includes a step of rounding a rubber material. In some embodiments, a step of providing a base includes a step of beveling a rubber material.

In some embodiments, provided methods include cleaning a base and/or flame treating a base.

In some embodiments, provided methods include cleaning a base. In some embodiments, provided methods include cleaning a base with a detergent and/or detergent solution. In some embodiments, provided methods include cleaning an exposed surface of a base with a detergent and/or detergent solution. In some embodiments, a detergent and/or detergent solution is or comprises soap and water. In some embodiments, a detergent and/or detergent solution is a pH neutral detergent. In some embodiments, a detergent and/or detergent solution has a pH of up to about 12. In some embodiments, a detergent and/or detergent solution is any surface preparing solution known in the art.

In some embodiments, provided methods of cleaning include, for example abrading, scouring, scrubbing, and/or washing. In some embodiments, provided methods of cleaning include, for example abrading, scouring, scrubbing, and/or washing a portion of a base for a period. In some embodiments, provided methods include cleaning includes abrading scouring, scrubbing, and/or washing a portion of a base with a tool. In some embodiments, cleaning tool, for example, is a brush, rag, or scouring pad.

In some embodiments, a cleaned base is dried or is permitted to dry. In some embodiments, drying is or comprises exposing a cleaned base to a desiccant. In some embodiments, a step of drying includes exposing a surface of a base to a gas. In some embodiments, a gas is an inert gas, such as nitrogen. In some embodiments, exposing a surface of a base to a gas. In some embodiments, a jet provides a gas at a higher pressure.

In some embodiments, a release agent is not utilized. In some embodiments, a release agent is utilized. In some embodiments, a release agent is utilized when a surface covering is a molded tile. In some embodiments, methods do not include a step of providing, applying or using a release agent. A release agent is a composition applied to a mold prior to placing and/or applying pressure of an uncured rubber material on the mold, so that a cured rubber material can be easily removed from the mold after curing. Release agents, for example, include silicone. In some embodiments, an adhesion promoter is not utilized. In some embodiments, methods do not include a step of providing, applying or using an adhesion promoter. Adhesion promoters, for example, include chlorinated polyolefin.

In some embodiments, provided methods include flame treating a cleaned surface of a base. In some embodiments, flame treating is or includes: a fuel, a gas, a gas:fuel ratio, a flame shape, a flame temperature, a gap defining a distance between a flame and a surface of a base, a flame energy/intensity (BTU/hr), and an exposure time, etc.

In some embodiments, provided methods include applying a protective coat as disclosed herein. In some embodiments, provided methods include applying a protective coat as disclosed herein. In some embodiments, applying is or includes manually applying, coating, spraying, roll coating, etc. In some embodiments, a step of applying includes for example roll coating. In some embodiments, a step of roll coating utilizes a roll coater. In some embodiments, the curing step is an active cure. In some embodiments, the curing step is a passive cure.

In some embodiments, a surface covering that is made or manufactured as provided herein is characterized by its resistance to abrasion, dents, fading (e.g. color fading), scuffing, scratching, mars, and/or wear, for example, even after prolonged normal use. In some embodiments, a surface covering that is made or manufactured as provided herein is characterized by its resistance to soiling. In some embodiments, a surface covering that is made or manufactured as provided herein is characterized by its ability to be cleaned with water (and/or a mild detergent) and wiping, such as wet mopping. In some embodiments, a surface covering that is made or manufactured as provided herein is or is characterized by a no-wax surface. In some embodiments, a surface covering that is made or manufactured as provided herein is characterized in that it exhibits resistance to abrasion, dents, fading (e.g. color fading), scuffing, scratching, mars, and/or wear, for example, even after prolonged normal use. In some embodiments, a surface covering that is made or manufactured as provided herein is characterized in that it is flexible, even after prolonged normal use. In some embodiments, a surface covering that is made or manufactured as provided herein is characterized in that it is resistant to breaking or crumbling under compression and/or lateral compression, even after prolonged normal use.

BRIEF DESCRIPTION OF THE DRAWING

FIG. 10 at panel (a) and (b) shows results for Competitor 1.

DEFINITIONS

Figure 1:
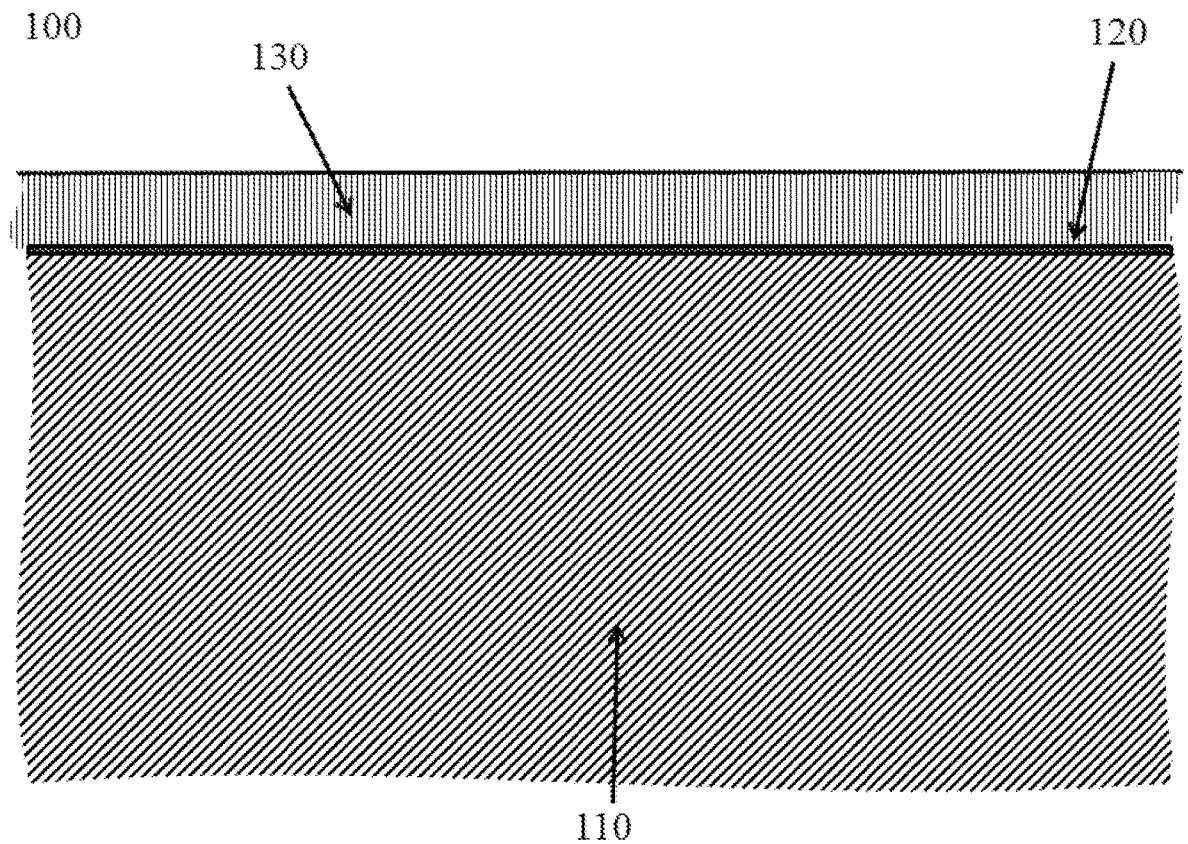
FIG. 1 shows a cross section of a surface covering according to some embodiments of the present disclosure.

In order for the present disclosure to be more readily understood, certain terms are first defined below. Additional definitions for the following terms and other terms are set forth throughout the specification.

In this application, unless otherwise clear from context, the term "a" may be understood to mean "at least one." As used in this application, the term "or" may be understood to mean "and/or." In this application, the terms "comprising" and "including" may be understood to encompass itemized components or steps whether presented by themselves or together with one or more additional components or steps. Unless otherwise stated, the terms "about" and "approximately" may be understood to permit standard variation as would be understood by those of ordinary skill in the art. Where ranges are provided herein, the endpoints are included. As used in this application, the term "comprise" and variations of the term, such as "comprising" and "comprises," are not intended to exclude other additives, components, integers or steps.

As used in this application, the terms "about" and "approximately" are used as equivalents. Any numerals used in this application with or without about/approximately are meant to cover any normal fluctuations appreciated by one of ordinary skill in the relevant art. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

"Associated": As used herein, the term "associated" or the phrase "associated with" typically refers to two or more entities in physical proximity with one another, either directly or indirectly (e.g., via one or more additional entities that serve as linker), to form a structure that is sufficiently stable so that the entities remain in physical proximity under relevant conditions, (e.g., standard operating conditions). In some embodiments, associated entities are covalently linked to one another. In some embodiments, associated entities are non-covalently linked or exhibit further non-covalent linkages. Exemplary non-covalent interactions include, but are not limited to, affinity interactions, metal coordination, physical adsorption, host-guest interactions, hydrophobic interactions, pi stacking interactions, hydrogen bonding interactions, van der Waals interactions, magnetic interactions, electrostatic interactions, dipole-dipole interactions, etc.

"Clean": As used herein, the term "clean", refers to an appearance that is new or substantially similar to new.

"Comparable": As used herein, the term "comparable", refers to two or more agents, entities, situations, sets of conditions, etc. that may not be identical to one another but that are sufficiently similar to permit comparison there between so that conclusions may reasonably be drawn based on differences or similarities observed. Those of ordinary skill in the art will understand, in context, what degree of identity is required in any given circumstance for two or more such agents, entities, situations, sets of conditions, etc. to be considered comparable.

"Conjugated": As used herein, the terms "conjugated," "linked," "attached," and "associated with," when used with respect to two or more moieties, means that the moieties are physically associated or connected with one another, either directly or via one or more additional moieties that serves as a linking agent, to form a structure that is sufficiently stable so that the moieties remain physically associated under the conditions in which structure is used. Typically the moieties are attached either by one or more covalent bonds or by a mechanism that involves specific binding. Alternately, a sufficient number of weaker interactions can provide sufficient additional stability to remain physically associated.

"Determine": Many methodologies described herein include a step of "determining". Those of ordinary skill in the art, reading the present specification, will appreciate that such "determining" can utilize or be accomplished through use of any of a variety of techniques available to those skilled in the art, including for example specific techniques explicitly referred to herein. In some embodiments, determining involves manipulation of a physical sample. In some embodiments, determining involves consideration and/or manipulation of data or information, for example utilizing a computer or other processing unit adapted to perform a relevant analysis. In some embodiments, determining involves receiving relevant information and/or materials from a source. In some embodiments, determining involves comparing one or more features of a sample or entity to a comparable reference.

"Hydrophilic": As used herein, the term "hydrophilic" and/or "polar" refers to a tendency to mix with, or dissolve easily in, water.

"Hydrophobic": As used herein, the term "hydrophobic" and/or "non-polar", refers to a tendency to repel, not combine with, or an inability to dissolve easily in, water.

"No-wax": As used herein, the term "no-wax", refers to surface coverings, in particular, flooring product surface coverings that do not require either initial buffing or waxing or subsequent maintenance buffing or waxing steps so that the an appearance of such a floor product is or looks new.

"Solution": As used herein, the term "solution" broadly refers to a homogeneous mixture composed of one phase. Typically, a solution comprises a solute or solutes dissolved in a solvent or solvents. It is characterized in that the properties of the mixture (such as concentration, temperature, and density) can be uniformly distributed through the volume.

"Substantially": As used herein, the term "substantially", and grammatic equivalents, refer to the qualitative condition of exhibiting total or near-total extent or degree of a characteristic or property of interest. One of ordinary skill in the art will understand that chemical phenomena rarely, if ever, go to completion and/or proceed to completeness or achieve or avoid an absolute result. One of ordinary skill in the art will further appreciate that achieving a result or near achieving a result is or includes within a range of up to about 15% of expectation.

"Substantially free of": As used herein, the phrase "substantially free of", and grammatic equivalents, refer to the qualitative condition of exhibiting absence or total, approximately or near-total absence. One of ordinary skill in the art will appreciate that achieving an absence or near total absence includes, within a range of less than 15%.

DETAILED DESCRIPTION OF CERTAIN EMBODIMENTS

The present disclosure, among other things, provides surface coverings. Implementations of surface coverings of the present disclosure are useful for a wide range of applications, including but not limited to: flooring, walls, countertops, vehicles, equipment, or furniture etc. In some embodiments, coverings as provided herein are useful for flooring. In some embodiments, flooring is any surface that is trod upon or walked on, for example, in any agricultural, athletic, commercial, farm, industrial, or residential venue/space. Flooring, for example, could also include an interior of a vehicle, such as an automobile. Coverings as provide herein are also useful with other surfaces of gymnasiums or athletic facilities or as a liner for other surfaces, for example, counter or countertops, cupboards or drawers. The present disclosure provides further insight that methods provided herein are particularly useful in the manufacture of such surface coverings with surprising and beneficial attributes.

In some embodiments, surface coverings as provided herein are characterized in that they are no-wax. In some embodiments, such surface coverings do not require initial maintenance and routine maintenance includes nothing more that cleaning, for example with water, a mild detergent and wiping. In some embodiments, surface coverings as provided herein are characterized in that they are or exhibit resistance to abrasion, cracks, dents, fading (e.g. color fading), mars, peeling, scuffing, scratching, and/or wear, for example, even after prolonged normal or extreme use. In some embodiments, surface coverings as provided herein are characterized in that they are flexible. In some embodiments, surface coverings as provided herein are characterized in that they are resistant to breaking and/or crumbling. In some embodiments, surface coverings as provided herein are characterized by at least one of these beneficial attributes. In some embodiments, surface coverings as provided herein are characterized by all of these beneficial attributes.

Traditional natural and synthetic rubber materials, such as commercially available rubber flooring materials are prevalent in areas having high walking traffic, athletic facilities, and numerous other uses. Rubber materials are soft to walk on or play on and accordingly are also quiet. Underlayment (e.g. cork, foam, etc.) can be added beneath rubber flooring to add further softness or cushion to such flooring as desired. Rubber materials are available in a lot of colors and may be fabricated with textures and patterns that appeal. Moreover, rubber flooring is water resistant and provides a reasonably easy to clean surface. Rubber flooring is known to be more resilient, stronger, and hard-wearing in a wide variety of uses and environments.

While rubber materials have significant benefits that make them a popular, they are also known to be vulnerable. Owing to their softness and elasticity, rubber flooring materials are more likely to abrade, dent, fade, mar, scuff, scratch, and/or wear.

Wax-based coatings can be applied to traditional rubber material and/or rubber material products. Such wax-based coatings can protect the underlying rubber material from soiling and/or damage resulting from use. Such wax-based coatings can also reduce some of the appearance of abrasion, cracks, dents, fading, mars, peeling, scuffing, scratching, and wear.

While being the norm, wax-based coatings have some of their own significant disadvantages. As above explained, rubber materials without a coating are vulnerable, thus a wax-based coatings must be immediately applied to a rubber material after its installation. For example, with traditional rubber flooring that is provided by a manufacturer, the product is shipped and installed without the wax coating. Thus, even surface coverings that need to be waxed, such initial waxing is provided by the manufacture and is performed by the customer. Initial maintenance of a brand new product is not favorable.

Additionally, wax-based coatings are temporary. With use such wax-based coatings will abrade, crack, dent, fade, mar, peel, scuff, scratch, and/or wear and wax-based coatings will exhibit evidence of these on its surface. In addition to initial maintenance, a wax-based coating applied to the rubber floor will also require regular maintenance. Regular maintenance requires stripping the soiled wax-based coating from the surface of the rubber material and reapplying. Without regular care and maintenance, such wax-based coatings will dry and crack resulting in a yellow cake.

The rubber materials industries and particularly rubber flooring manufactures have long tried to produce no-wax products. Typical rubber flooring consists of a sheet or molded tile of a rubber material. At least one layer of a protective coating is adhered to the top surface and/or exposed surface of the rubber flooring. The end-use performance is to some degree dependent on factors, including for example, the rubber material, the protective coating material, any adhesives, activating agents, and/or molding release agents present. For example, the rubber floor's ability to resist staining, the rubber floor's ability to resist abrasion, cracks, dents, fading (e.g. color fading), mars, peeling, scuffing, scratching, and/or wear, for example, even after prolonged normal use. While recent understanding of improved adhesion of coatings on rubber materials has aided development, achieving a no-wax rubber floor has been elusive. Examples of such rubber flooring products that include non-temporary protective coatings are prone to at least one failure, such as surface cracking, crumbling, easily abraded.

The present disclosure encompasses a recognition that when traditional surface coverings are exposed to high use and/or high traffic, these traditional coverings are vulnerable to high incidence of abrasion, cracks, dents, fading, mars, peeling, scuffing, scratching, and wear. The present disclosure further encompasses a recognition that traditional surface coverings are vulnerable to crumbling under compression and/or compression with lateral movement.

While not wishing to be bound to a particular theory, the present disclosure encompasses a recognition that traditional protective coatings show, for example, abrasion, breaking, cracking, or crumbling with normal use because of its composition or combination of rubber materials, coating materials, their lack of adhesion, stress at the interface between the rubber and the coating, and/or mismatching materials or methods of assembly.

Surface Coverings

Various embodiments according to the present disclosure include surface coverings and methods of manufacturing such surface coverings.

In some embodiments, surface coverings include a base and a protective coat. In some embodiments, surface coverings are a composition or combination including a base and a protective coat.

In some embodiments, surface coverings are characterized in that their exposed surfaces are no-wax surfaces. In some embodiments, such no-wax surfaces do not require initial maintenance and routinely only need cleaning. In some embodiments, surface coverings are characterized by they are or can be resistant to abrasion, cracks, dents, fading, mars, peeling, scuffing, scratching, and wear. In some embodiments, surface coverings in accordance with the present disclosure exhibit superior performance and demonstrate unexpected resistance. In some embodiments, provided surface coverings are flexible such that they stretch. In some embodiments, provided surface coverings are resilient to breaking or crumbling under compression and lateral movement. In some embodiments, surface coverings as provided herein include at least one of the above benefits or attributes. In some embodiments, surface coverings as provided herein include all of the above benefits or attributes.

In some embodiments, surface coverings are useful for a wide range of applications, including but not limited to: flooring, walls, countertops, furniture etc. in commercial, industrial, and residential applications. The present disclosure also provides methods of preparing such coverings. Provided surface coverings are particularly useful as flooring. In some embodiments, provided surface coverings are successfully employed as wear resistant surfaces and/or surface coverings, such as rubber mats, rubber matting, rolled rubber flooring, molded rubber tile, etc.

The present disclosure encompasses a recognition that surface coverings as provided herein, including a rubber material and having a protective coating applied on a surface thereto exhibit a surprising resistance to abrasion, breaking, cracks, crumbling, dents, fading, mars, peeling, scuffing, scratching, and wear during a long period of regular or hard use. For example, a rubber flooring material may see high traffic, hard-wear (e.g. heavy equipment placed on it or move across it), exposure to chemicals (e.g. solvents), polishing, etc.

Compositions and Combinations

The present disclosure provides surface coverings. In some embodiments, provided surface coverings are compositions or combination that include a base having a protective coat applied thereto.

In some embodiments, surface coverings are engineered and/or fabricated from compositions or combinations. In some embodiments, provided compositions are or include materials that may be stacked on one another. In some embodiments, provided surface coverings (e.g. a base or a protective coat) are or include multiple individual layers of material stacked on one another. In general, those skilled in the art, such as manufacturers of surface coverings and in particular flooring view such surface coverings as materials or layers of materials that are assembled from the bottom up.

In some embodiments, provided surface coverings include a base. In some embodiments, a base is or includes a rubber material. In some embodiments, provided surface coverings include a base having a protective coat adhered thereto. As detailed herein, provided surface coverings include a base and a protective coat adhered thereto at least a portion of a base.

In some embodiments, an interface between a base and a protective coat is characterized by crosslinks formed there between.

In some embodiments, surface coverings as disclosed herein have a simplified construction. In some embodiments, surface coverings as disclosed herein do not require "balancing" layers to remain flat.

In some embodiments, surface coverings have a thickness. In some embodiments, surface coverings as provided herein have a thickness in a range of about 2 mm to about 6 mm. In some embodiments, surface coverings as provided herein have a thickness in a range from: about 1.5 mm to about 10 mm, about 1.5 mm to about 7.5 mm, or about 0.5 mm to about 6 mm. In some embodiments, surface coverings as provided herein have a thickness of about 1.5 mm, about 2 mm, about 2.5 mm, about 3 mm, about 3.5 mm, about 4 mm, about 4.5 mm, about 5 mm, about 5.5 mm, about 6 mm, or about 6.5 mm.

In some embodiments, a thickness of a surface covering as disclosed herein is any desired thickness. In some embodiments, a preferred thickness for an entire surface covering article is approximately 2 mm, 3 mm, or 4 mm. In some embodiments, preferred surface coverings have a thickness of about 3 mm.

In some embodiments, surface coverings are configured as sheets. In some embodiments, sheets may be designed to adopt a variety of sizes, shapes, and thicknesses. In some embodiments, surface coverings are configured as tiles, e.g. molded tiles. In some embodiments, tiles are designed or molded to adopt a variety of sizes, shapes, and thicknesses. In some embodiments, a tile surface has a varying topography such that its thickness will differ across its surface area. As such, in some embodiments, sheets and tiles are adaptable and may be readily tailored to meet an end use.

In some embodiments, a shape of a molded tile surface covering of the present disclosure is any desirable shape. In some embodiments, surface coverings as disclosed herein may have rounded, beveled, or depressed edges or may be mechanically embossed. In some embodiments, surface coverings do not break, cleave, crack, or crumble when embossed or the edges are rounded, beveled, or depressed.

In some embodiments, a shape of a molded tile surface covering of the present disclosure is a square. In some embodiments, a square shaped surface covering article is for example 9"×9", 12"×12", 14"×14", 16"×16", 18"×18", 2'×2', 3'×3', 4'×4', or more. In some embodiments, a shape of a surface covering of the present disclosure is a rectangle. In some embodiments, a rectangular shaped surface covering article is for example 1'×2', 2'×4', or 4'×8' or more. In some embodiments, a shape of a surface covering of the present disclosure is an octagon. In some embodiments, a shape of a surface covering of the present disclosure is any geometric shape. In some embodiments, a shape of a surface covering of the present disclosure is any shape.

Base

In some embodiments, compositions and/or surface coverings formed from compositions and/or materials include a base.

In some embodiments, a base is or includes layers. In some embodiments, a base is or includes multiple layers of a base stacked on one another. In some embodiments, a base is or includes a polymer. In some embodiments, a base is or includes a polymer mixture. In some embodiments, a base is or includes any rubber material and/or methods of making as are described in U.S. Pat. No. 8,586,661, to Mercier et al., entitled "Surface Covering Materials and Products", the entire contents of which are hereby incorporated in their entirety herein.

In some embodiments, a base provides a structural stability and/or solidity of surface coverings. In some embodiments, a base of a surface covering is or includes at least one layer. In some embodiments, a base is or has a design or a designed layer, for example colors or a pattern.

In some embodiments, a base has a thickness. In some embodiments, a base has a thickness in a range of about 2 mm to about 6 mm. In some embodiments, a base has a thickness in a range of about 1.5 mm to about 10 mm; about 1.5 mm to about 7.5 mm; or about 1.5 mm to about 6 mm. In some embodiments, a base has a thickness of about 1.5 mm, about 2 mm, about 2.5 mm, about 3 mm, about 3.5 mm, about 4 mm, about 4.5 mm, about 5 mm, about 5.5 mm, about 6 mm, or about 6.5 mm.

In some embodiments, a base is or includes a about 99% of a thickness of surface covering, about 98% of a thickness of a composition and/or a surface covering, about 97% of a thickness of a composition and/or a surface covering, about 96% of a thickness of a composition and/or a surface covering, about 95% of a thickness of a composition and/or a surface covering, about 94% of a thickness of a composition and/or a surface covering, about 93% of a thickness of a composition and/or a surface covering, about 92% of a thickness of a composition and/or a surface covering, about 91% of a thickness of a composition and/or a surface covering, about 90% of a thickness of a composition and/or a surface covering, about 89% of a thickness of a composition and/or a surface covering, about 88% of a thickness of a composition and/or a surface covering, about 87% of a thickness of a composition and/or a surface covering, about 86% of a thickness of a composition and/or a surface covering, about 85% of a thickness of a composition and/or a surface covering, about 84% of a thickness of a composition and/or a surface covering, about 83% of a thickness of a composition and/or a surface covering, about 82% of a thickness of a composition and/or a surface covering, about 81% of a thickness of a composition and/or a surface covering, or about 80% of a thickness of a composition and/or a surface covering.

In some embodiments, a base is or includes a rubber material.

In some embodiments, a rubber material is a natural or synthetic polymer and/or mixtures. In some embodiments, a rubber material as disclosed herein is or includes a polymer and/or a blend of polymers.

In some embodiments, a rubber material is or includes an acid copolymer; an acrylate copolymer; a butyl rubber; a copolymer; an elastomer; an ethylene-acrylic rubber; an ethylene-propylene rubber; an ethylene-propylene-diene rubber; an ethylene-octene copolymer; a styrene-butadiene copolymer; an ionomer; a low density polyethylene; a polybutene; a polyethylene; a polymer; a polymethylpentene; a polypropylene; a styrene-acrylate copolymer; a styrene-methylacrylate block copolymer; a styrene-polyolefin block copolymer; a thermoplastic; a thermoplastic polyolefin; a terpolymer; a thermoplastic polyurethane; and combinations, mixtures, or blends thereof.

In some embodiments, a rubber material as disclosed herein is or includes a copolymer. In some embodiments, a copolymer is or includes a polyolefin copolymer. In some embodiments, a copolymer is or includes a terpolymer. In some embodiments, a copolymer is a polyolefin copolymer. In some embodiments, a copolymer is a terpolymer. In some embodiments, rubber materials as disclosed herein are blend of polymers, for example, a blend of any of the above listed polymers, such as for example, a blend of a terpolymer with a copolymer. In some embodiments, rubber materials are or include homopolymers.

In some embodiments, a rubber material as disclosed herein is or includes an elastomeric polymer. In some embodiments, a rubber material is or includes a polyolefin-based elastomer. In some embodiments, a polyolefin-based elastomer is or includes ethylene-propylene rubber, ethylene-propylene-diene rubber, high styrene-butadiene copolymer, ethylene-acrylic rubber (e.g., Vamac), ethylene-vinyl acetate, polyisoprene or natural rubber, polybutadiene, polyisobutylene, polyurethanes, or butyl rubber. In some embodiments, a polyolefin-based thermoplastic is or includes combinations of any of the above.

In some embodiments, a rubber material as disclosed herein is or includes a thermoplastic polymer. In some embodiments, a rubber material as disclosed herein is or includes a thermoplastic polyurethane. In some embodiments, a rubber material as disclosed herein is or includes a thermoplastic polyolefin. In some embodiments, a thermoplastic polyurethane is or includes a polyethylene, polypropylene, polymethylpentene, polybutene, or combinations thereof. In some embodiments, a rubber material is or includes polyolefin-based thermoplastic. In some embodiments, a polyolefin-based thermoplastic is or includes polyethylene, such as low-density polyethylene, linear low-density polyethylene, or ultra-low density polyethylene. In some embodiments, a base as disclosed herein is or includes a thermoplastic polyolefin. In some embodiments, a polyolefin-based thermoplastic is or includes an ionomer, an acid copolymer such as ethylene methyl 3-methoxyacrylate copolymer, ethylene methacrylic acid copolymer. In some embodiments, a polyolefin-based thermoplastic is or includes an acrylate copolymer (e.g. MA, MMA, BMA/MMA). In some embodiments, a polyolefin-based thermoplastic is or includes an ethylene-octene copolymer. In some embodiments, a polyolefin-based thermoplastic is or includes a styrene-acrylate copolymer, a styrene-methylacrylate block copolymer, or a styrene-polyolefin block copolymer. In some embodiments, a polyolefin-based thermoplastic is or includes combinations of any of the above.

In some embodiments, thermoplastic polymers are characterized in that when its shape is altered at elevated temperatures, unlike some rubber materials, thermoplastic materials resist deformation, that is, these material retain their shape. Some exemplary thermoplastic elastomeric polymers include, for example, polyethylene, polypropylene, polystyrene, polyesters, polycarbonate, nylon, poly(methyl methacrylate).

In some embodiments, a rubber material is characterized by its density. In some embodiments, a rubber material is characterized by a density in a range of about 0.8 $g/cm^3$ to about 1.9 $g/cm^3$. In some embodiments, a rubber material is characterized by a density in a range of about 0.8 $g/cm^3$ to about 1.5 $g/cm^3$. In some embodiments, a rubber material is characterized by a density of about 0.8 $g/cm^3$; of about 0.9 $g/cm^3$; of about 1.0 $g/cm^3$; of about 1.1 $g/cm^3$; of about 1.2 $g/cm^3$; of about 1.3 $g/cm^3$; of about 1.4 $g/cm^3$; of about 1.5 $g/cm^3$; of about 1.6 $g/cm^3$; of about 1.7 $g/cm^3$; of about 1.8 $g/cm^3$; or of about 1.9 $g/cm^3$.

In some embodiments, a rubber material is about 50% to about 99% by weight of a base. In some embodiments, a rubber material is about 75% by weight of a base. In some embodiments, a rubber material is about 45% to about 99% by weight of a base.

In some embodiments, a base includes a binder. In some embodiments, a binder includes: a polymer, a tackifier, rheology modifiers, and/or plasticizers. In some embodiments, a binder includes additives. In some embodiments, a binder includes flow agents. In some embodiments, a binder includes stabilizers.

In some embodiments, a base includes one or more pigments. In some embodiments, pigments provide desired shading or coloring for a base. In some embodiments, pigments include, for example: titanium dioxide, iron oxide, etc.

In some embodiments, a base includes one or more fillers. In some embodiments, fillers are or include calcium carbonate, limestone, dolomite, amorphous silica, clay, recycled materials (e.g., dry wall dust), or combinations thereof.

In some embodiments, a base also includes a binder. A binder holds a base together. In some embodiments, a binder is an organic material. In some embodiments, a binder is a polymer, for example, EVA. In some embodiments, a binder includes: tackifiers, rheology modifiers, and/or plasticizers. In some embodiments, a tackifier is or includes hydrocarbons and/or rosin esters. In some embodiments, a rheology modifier is a low molecular weight additive. In some embodiments, a binder is or includes polymer flakes that crosslink thereby sticking together. In some embodiments, a binder includes additives. In some embodiments, a binder includes flow agents. In some embodiments, a binder includes stabilizers.

In some embodiments, binder content of a base affects an overall level of rigidity of a surface covering. In some embodiments, total organic content of a binder of a base is less than about 35% by weight, more preferably less than about 20% or less by weight, more preferably less than about 18% or less by weight, or more preferably less than about 17% or less by weight. In some embodiments, total organic content of a binder of a base is approximately 26% by weight or approximately 28% by weight may also be used.

In some embodiments, a binder includes: about 5% by weight of a base, about 10% by weight of a base, about 15% by weight of a base, about 20% by weight of a base, about 25% by weight of a base, about 30% by weight of a base, about 35% by weight of a base, or about 40% by weight of a base, about 45% by weight of a base, about 50% by weight of a base, about 55% by weight of a base, about 60% by weight of a base, or about 65% by weight of a base.

In some embodiments, a base includes at least one pigment. In some embodiments, pigments provide shading for a base. In some embodiments, pigments include, for example, titanium dioxide.

In some embodiments, a base includes fillers. In some embodiments, fillers are or include calcium carbonate, limestone, dolomite, amorphous silica, clay, recycled materials, (e.g., dry wall dust), or combinations thereof.

In some embodiments, a base does not break, cleave, crack, or crumble when embossed. In some embodiments, a base does not break, cleave, crack, or crumble when edges are rounded, beveled, or depressed.

In some embodiments, a base is designed and engineered to resist breaking, bubbling, buckling, and crumbling.

Protective Coat

In some embodiments, surface coverings as disclosed herein include a protective coat. In some embodiments, surface coverings as disclosed herein include a base and a protective coat atop the base.

In some embodiments, a protective coat is or includes a single layer. In some embodiments, a protective coat is or includes multiple layers stacked on one another.

In some embodiments, a protective coat is or includes a polyurethane, polyacrylic, and blends or mixtures thereof.

In some embodiments, a thickness of a protective coat is about 15 µm to about 25 µm. In some embodiments, a thickness of a protective coat is about 10 µm to about 50 µm. In some embodiments, a thickness of a protective coat is about 1 µm, about 2 µm, about 3 µm, about 4 µm, about 5 µm, about 6 µm, about 7 µm, about 8 µm, about 9 µm, about 10 µm, about 11 µm, about 12 µm, about 13 µm, about 14 µm, about 15 µm, about 16 µm, about 17 µm, about 18 µm, about 19 µm, about 20 µm, about 21 µm, about 22 µm, about 23 µm, about 24 µm, about 25 µm, about 26 µm, about 27 µm, about 28 µm, about 29 µm, about 30 µm, about 31 µm, about 32 µm, about 33 µm, about 34 µm, about 35 µm, about 36 µm, about 37 µm, about 38 µm, about 39 µm, about 40 µm, about 41 µm, about 42 µm, about 43 µm, about 44 µm, about 45 µm, about 46 µm, about 47 µm, about 48 µm, about 49 µm, or about 50 µm or more.

In some embodiments, a protective coat is a liquid. In some embodiments, a protective is designed to exhibit superior adhesion to a base.

In some embodiments, a protective coat is or has an application weight of about 25 g/m². In some embodiments, protective coat has an application weight in a range between about 15 g/m² and about 35 g/m². In some embodiments, a UV cured or curable layer has an application weight about 0.5 g/m², about 1 g/m², about 2 g/m², about 3 g/m², about 4 g/m², about 5 g/m², about 6 g/m², about 7 g/m², about 8 g/m², about 9 g/m², about 10 g/m², about 11 g/m², about 12 g/m², about 13 g/m², about 14 g/m², about 15 g/m², about 16 g/m², about 17 g/m², about 18 g/m², about 19 g/m², about 20 g/m², about 21 g/m², about 22 g/m², about 23 g/m², about 24 g/m², about 25 g/m², about 26 g/m², about 27 g/m², about 28 g/m², about 29 g/m², about 30 g/m², about 31 g/m², about 32 g/m², about 33 g/m², about 34 g/m², about 35 g/m², about 36 g/m², about 37 g/m², about 38 g/m², about 39 g/m², or about 40 g/m² or more.

In some embodiments, a protective coat is cured or curable. In some embodiments, a protective coat is UV cured or UV curable.

In some embodiments, a protective coat is or appears clear.

In some embodiments, a protective coat is or has a 60° gloss value of about 3 to about 40.

In some embodiments, a protective coat is designed and engineered to resist abrasions, cracks, dents, fading, marring, peeling, scuffing, scratching, and/or wear.

In some embodiments, a surface covering having a protective coat does not break, cleave, crack, or crumble, when compressed. In some embodiments, a surface covering having a protective coat does not break, cleave, crack, or crumble, when exposed to a mandrel test as provided herein. In some embodiments, a surface covering having a protective coat does not break, cleave, crack, or crumble when edges are rounded, beveled, or depressed. In some embodiments, a clear material is designed to resist mechanical damage, such rips or tears.

Properties

In some embodiments, surface coverings as provided herein are substantially resistant to crumbling. In some embodiments, surface coverings as provided herein, having no-wax surfaces are cleanable and substantially abrasion resistant. In some embodiments, surface coverings as provided herein have and/or maintain desired flexibility. In some embodiments, provided surface coverings exhibit all of the above mentioned benefits.

Cleanability

In some embodiments, surface coverings as disclosed herein are characterized in that they are no-wax.

In some embodiments, surface coverings as disclosed herein are characterized by their ability to resist soiling. In some embodiments, surface coverings as disclosed herein are characterized by their ability to resist soiling without initial maintenance. In some embodiments, surface coverings as disclosed herein are characterized by their ability to resist soiling without a wax coating applied thereto. In some embodiments, provided surface coverings following installation do not receive a wax or other commercially available protectant. In some embodiments, provided surface coverings following installation do not need or want a wax or other commercially available protectant applied to them. In some embodiments, provided surface coverings are particularly useful, for example, as a floor covering because such surface coverings and/or exposed surfaces thereof are no-wax.

In some embodiments, provided surface coverings following installation do not require any regular maintenance or treatment to prolong their use. In some embodiments, provided surface coverings following installation do not require any preventative maintenance or treatment.

In some embodiments, provided surface coverings resist exposure to soiling, such that is they are cleanable. In some embodiments, provided surface coverings are useful as surface coverings because such surface coverings and/or exposed surfaces thereof are characterized by their ability to be cleaned with water and wiping, such as wet mopping. In some embodiments, provided surface coverings following installation are only maintained with water, diluted floor cleaner, and wiping. In some embodiments, when cleaned, provided surface coverings are substantially free of soiling. In some embodiments, when cleaned, provided surface coverings are substantially free of soiling following exposure to prolonged normal wear or hard use.

In some embodiments, soiling is or includes a blend of clay, carbon black, and pigments. In some embodiments, soiling is or includes a blend of clay, carbon black, and pigments that is ground into a no-wax surface of a surface covering as provided herein.

In some embodiments, provided surface coverings that are soiled or dirtied are cleanable. In some embodiments, provided surface coverings that are soiled or dirtied are cleanable with water and wiping. In some embodiments, wiping is for example rubbing a surface with a cloth.

In some embodiments, provided surface coverings are characterized in that they are cleanable. In some embodiments, surface coverings as provided herein are cleanable using a rotary cleaning machine. In some embodiments, a rotary cleaning machine is a standard machine that operates at 300 rpm. In some embodiments, surface coverings as provided herein are cleanable using a rotary cleaning machine with a red or green scouring pad and operating at 300 rpm for 2 minutes.

In some embodiments, provided surface coverings are characterized by their ability to be cleaned with water and wiping, such as wet mopping between soiling in repetitive cycles. In some embodiments, provided surface coverings are characterized by their ability to be cleaned with water and wiping, such as wet mopping between soiling in repetitive cycles without application of a wax coat before or in-between cycles.

In some embodiments, surface coverings as provided herein are substantially clean and substantially free of soiling after repetitive soiling and cleaning cycles. In some embodiments, exposure is or includes cycles of soiling with cleaning in-between. In some embodiments, provided surface coverings are cleanable through repetitive cycles of soiling and cleaning. In some embodiments, exposure is or includes cycles of soiling and cleaning that mimics normal use. In some embodiments, exposure is or includes cycles of soiling and cleaning far exceeding that of normal use. In some embodiments, exposure to cycles of soiling and cleaning mimics or exceeds extreme regular wear and/or use of provided surface coverings, for example when they are used as flooring.

In some embodiments, surface coverings as provided herein are substantially clean after they are exposed to at least 20 cycles of such soiling and cleaning. In some embodiments, surface coverings as provided herein are substantially clean after they are exposed to at least 30 cycles of such soiling and cleaning. In some embodiments, surface coverings as provided herein are substantially clean after they are exposed to at least 50 cycles of such soiling and cleaning.

Abrasion Resistance

In some embodiments, surface coverings as disclosed herein are characterized in that they are resilient to various forms of exposure, mechanical wear and/or damage. In some embodiments, mechanical damage includes, for example, scratches, scuffs, abrasions, dents, mars, fading (e.g. color fading) or combinations thereof, for example, even after prolonged normal use. In some embodiments, surface coverings as disclosed herein are characterized by their resistance to abrasion, cracks, dents, fading (e.g. color fading), mars, peeling, scuffing, scratching, and/or wear, for example, even after prolonged normal or extreme use. In some embodiments, provided surface coverings are substantially free of abrasion, cracking, dents, fading, scuffing, scratching, mars, peeling, and/or wear following exposure.

In some embodiments, provided surface coverings are soiled to assess and confirm resistance to abrasion, cracks, dents, fading (e.g. color fading), mars, peeling, scuffing, scratching, and/or wear. In some embodiments, soiling is or includes a blend of clay, carbon black, and pigments. In some embodiments, soiling is or includes a blend of clay, carbon black, and pigments that is ground into a top layer of a surface covering as provided herein. In some embodiments, ground or grinding is or includes pressing on a blend and twisting. In some embodiments, soiling includes a person wearing a boot and grinding a blend of clay, carbon black, and pigments into a surface of a surface covering as provided herein.

In some embodiments, surface coverings as provided herein are substantially free of abrasion, mars, peeling, scuffing, scratching, and/or wear after exposure to a rotary cleaning machine operated on an exposed surface of a surface covering, a no-wax surface. In some embodiments, surface coverings as provided herein are substantially clean and substantially free of abrasion, mars, peeling, scuffing, scratching, and/or wear after they are soiled with a blend of clay, carbon black, and pigments that is ground into a no-wax surface of a surface covering and cleaned with a rotary cleaning machine.

In some embodiments, surface coverings as provided herein are substantially free of abrasion, mars, peeling, scuffing, scratching, and/or wear after exposure to a rotary cleaning machine having standard red or green scouring pads that is operated on an exposed surface of a surface covering, a no-wax surface at 300 rpm for 2 minutes. In some embodiments, surface coverings as provided herein are substantially free of abrasion, mars, peeling, scuffing, scratching, and/or wear after exposure to a rotary cleaning machine having standard red or green scouring pads that is operated on an exposed surface of a surface covering, a no-wax surface at 300 rpm for at least about 2 minutes, at least about 4 minutes, at least about 6 minutes, at least about 8 minutes, at least about 10 minutes, at least about 12 minutes, at least about 14 minutes, at least about 16 minutes, at least about 18 minutes, at least about 20 minutes, or at least about 30 minutes.

In some embodiments, a cleaning portion of a cycle includes exposure to a blend of clay, carbon black, and pigments that is ground into a no-wax surface of a surface covering as provided herein. In some embodiments, surface coverings as provided herein are substantially clean and substantially free of abrasion, mars, peeling, scuffing, scratching, and/or wear after cycles of exposure to soiling and cleaning with a rotary cleaning machine having standard red or green scouring pads that is operated on a no-wax surface thereof. In some embodiments, surface coverings as provided herein are substantially clean and substantially free of abrasion, mars, peeling, scuffing, scratching, and/or wear after exposure to a rotary cleaning machine having standard red or green scouring pads that is operated on an exposed surface of a surface covering, a no-wax surface at 300 rpm for at least about 2 minutes, at least about 4 minutes, at least about 6 minutes, at least about 8 minutes, at least about 10 minutes, at least about 12 minutes, at least about 14 minutes, at least about 16 minutes, at least about 18 minutes, at least about 20 minutes, or at least about 30 minutes.

In some embodiments, surface coverings as provided herein are substantially clean and substantially free of abrasion, mars, peeling, scuffing, scratching, and/or wear after multiple cycles of soiling and cleaning. In some embodiments, surface coverings as provided herein are substantially clean and substantially free of abrasion, mars, peeling, scuffing, scratching, and/or wear after they are exposed to at least 20 cycles of such soiling and cleaning. In some embodiments, multiple soiling and cleaning cycles is at least about 2 cycles, at least about 3 cycles, at least about 4 cycles, at least about 5 cycles, at least about 6 cycles, at least about 7 cycles, at least about 8 cycles, at least about 9 cycles, at least about 10 cycles, at least about 11 cycles, at least about 12 cycles, at least about 13 cycles, at least about 14 cycles, at least about 15 cycles, at least about 16 cycles, at least about 17 cycles, at least about 18 cycles, at least about 19 cycles, at least about 20 cycles, at least about 21 cycles, at least about 22 cycles, at least about 23 cycles, at least about 24 cycles, at least about 25 cycles, at least about 26 cycles, at least about 27 cycles, at least about 28 cycles, at least about 29 cycles, at least about 30 cycles, at least about 35 cycles, at least about 40 cycles, at least about 45 cycles, or at least about 50 cycles.

In some embodiments, surface coverings are characterized by a Taber abrasion value. In some embodiments, surface coverings are characterized by a Taber abrasion of less than about 150 mg per 1000 revolutions. In some embodiments, surface coverings are characterized by a Taber abrasion of less than about 150 mg per at least about 2000 revolutions. In some embodiments, surface coverings as provided herein are characterized by a Taber abrasion value of less than about 150 mg per at least about 2100 revolutions; at least about 2200 revolutions, at least about 2300 revolutions, at least about 2400 revolutions, at least about 2500 revolutions, at least about 2600 revolutions, at least about 2700 revolutions, at least about 2800 revolutions, at least about 2900 revolutions, at least about 3000 revolutions, at least about 3100 revolutions, at least about 3200 revolutions, at least about 3300 revolutions, at least about 3400 revolutions, at least about 3500 revolutions, at least about 3600 revolutions, at least about 3700 revolutions, at least about 3800 revolutions, at least about 3900 revolutions, at least about 4000 revolutions, at least about 4100 revolutions, at least about 4200 revolutions, at least about 4300 revolutions, at least about 4400 revolutions, at least about 4500 revolutions, at least about 4600 revolutions, at least about 4700 revolutions, at least about 4800 revolutions, at least about 4900 revolutions, or at least about 5000 revolutions.

In some embodiments, surface coverings are characterized by a Shore A hardness. In some embodiments, surface coverings are characterized by a Shore A hardness of about 95 ASM D2240. In some embodiments, surface coverings are characterized by an ASM D2240 Shore A hardness of at least about 20, of at least about 25, of at least about 30, of at least about 35, of at least about 40, of at least about 45, of at least about 50, of at least about 55, of at least about 60, of at least about 65, of at least about 70, of at least about 75, of at least about 80, of at least about 85, of at least about 90, of at least about 95, or of at least about 100 or more.

Chemical, Light, Mechanical, and Thermal Stability

In some embodiments, surface coverings are characterized by a thermal stability. In some embodiments, surface coverings are characterized by a thermal stability of a ΔE of less than about 5 ASTM F1514. In some embodiments, surface coverings are characterized by a light stability. In some embodiments, surface coverings are characterized by a light stability of a ΔE of less than about 5 ASTM F1515.

In some embodiments, provided surface coverings are characterized in that they are resistant to color fading. In some embodiments, an extent to which color fades or changes over time due to exposure to heat, light, wear, etc. is quantized and/or may be assessed through a difference or a distance between colors, a Delta E (ΔE). A visibility, or the lack thereof, of a change in color can be determined by measuring a color change (Delta E, ΔE) of a surface covering, surface covering. The color change is a composite of three variables, lightness (L*), red/green value (a*), and yellow/blue value (b*). A color change of a surface covering material is assessed, for example, using a spectrophotometer and measuring a ΔE before and after an exposure.

In some embodiments, provided surface coverings are characterized in that they are light stable and resistant to color fading over time. In some embodiments, surface coverings are characterized by a ΔE. In some embodiments, surface coverings are characterized by a ΔE of less than 5 following Xenon arc exposure for at least 400 hours. In some embodiments, surface coverings are characterized by an average ΔE in a range of about 1 to about 5 when light resistance is measured by spectrophotometer after aging at the temperature of 145° F. for 300 hours.

In some embodiments, provided surface coverings are characterized by a ΔE of less than 5 following Xenon Arc Exposure for at least 400 hours.

In some embodiments, provided surface coverings are characterized in that their colors and/or designs do not do not fade when exposed to wet or moist environments. In some embodiments, provided surface coverings are resistant to fading in highly alkaline environments, for example environments having a pH of about 7 to about 12.

In some embodiments, provided surface coverings are characterized in that the layers do not separate when exposed to wet or moist environments. In some embodiments, provided surface coverings are resistant to delamination, peeling, or separation in moist environments, for example environments having a pH between about 7 and about 12.

Flexibility

In some embodiments, surface coverings as provided herein are flexible. In some embodiments, provided surface coverings are characterized in that they are flexible. In some embodiments, provided surface coverings are flexible such that they stretch.

In some embodiments, surface coverings are characterized by an elongation. In some embodiments, provided surface coverings are characterized by an elongation of about 95% ASTM D412.

In some embodiments, surface coverings are characterized by a tensile strength. In some embodiments, surface coverings are characterized by a tensile strength of about 6.2 MPa ASTM D412. In some embodiments, surface coverings are characterized by an ASTM D412 tensile strength of about 1 MPa; of about 2 MPa; of about 3 MPa; of about 4 MPa; of about 5 MPa; of about 6 MPa; of about 7 MPa; of about 8 MPa; of about 9 MPa; or of about 10 MPa;

In some embodiments, surface coverings are characterized by a tear strength. In some embodiments, surface coverings are characterized by a tear strength of about 190 lb/in ASTM D624. In some embodiments, surface coverings are characterized by an ASTM D624 tear strength of about 150 lb/in; of about 160 lb/in; of about 170 lb/in; of about 180 lb/in; of about 190 lb/in; of about 200 lb/in; of about 210 lb/in; of about 220 lb/in; of about 230 lb/in; of about 240 lb/in; of about 250 lb/in; of about 260 lb/in; of about 270 lb/in; of about 280 lb/in; of about 290 lb/in; or of about 300 lb/in.

In some embodiments, provided surface coverings that are flexible are characterized in that when a mandrel is pressed onto a no-wax surface according to ASTM F137, it is substantially free of cracks. In some embodiments, when a mandrel of at least 1 inch OD is pressed onto a no-wax surface according to ASTM F137, it is substantially free of cracks. In some embodiments, when a mandrel's OD less than about 0.1 inch; less than about 0.2 inch; less than about 0.3 inch; less than about 0.4 inch; less than about 0.5 inch; less than about 0.6 inch; less than about 0.7 inch; less than about 0.8 inch; less than about 0.9 inch; less than about 1 inch; less than about 1.5 inch; less than about 2 inch, or less than about 2.5 inch is pressed onto a no-wax surface according to ASTM F137, it is substantially free of cracks.

Resistance to Crumbling

In some embodiments, provided surface coverings are further characterized by their resistance breaking and/or crumbling under compression. In some embodiments, provided surface coverings are further characterized by their resistance breaking and/or crumbling under compression with lateral movement. In some embodiments, when provided surface coverings are adhered and/or laminated to a substrate, such as a sub-floor, and exposed to such compression with lateral movement, they exhibit flexibility and resistance breaking and/or crumbling.

In some embodiments, surface coverings as provided herein are resistant to breaking or crumbling. In some embodiments, surface coverings are resistant to breaking or crumbling such that they do not buckle or bubble when exposed to compression. In some embodiments, surface coverings are resistant to breaking or crumbling such that they do not buckle or bubble when exposed to compression with combined downward and lateral force.

In some embodiments, a standard hospital bed caster holding at least 400 lbs is mounted on top of a no-wax surface of a surface covering as provided herein. In some embodiments, such a caster is moved in a pattern. In some embodiments, such a caster travels in a path pivoting on itself. In some embodiments, surface coverings as provided herein that are exposed to such wear are substantially free of bubbles, buckles, cracks, tearing, and/or crumbling following 1000 cycles through such a pattern. In some embodiments, surface coverings as provided herein are substantially free of bubbles, buckles, cracks, tearing, and/or crumbling following at least about 100 cycles through such a pattern, at least about 200 cycles through such a pattern, at least about 300 cycles through such a pattern, at least about 400 cycles through such a pattern, at least about 500 cycles through such a pattern, at least about 600 cycles through such a pattern, at least about 700 cycles through such a pattern, at least about 800 cycles through such a pattern, at least about 900 cycles through such a pattern, at least about 1000 cycles through such a pattern, at least about 2000 cycles through such a pattern, at least about 3000 cycles through such a pattern, at least about 4000 cycles through such a pattern, or at least about 5000 cycles.

Methods of Making and Using Surface Coverings

In some embodiments, the present disclosure includes methods of manufacturing surface coverings disclosed herein.

In some embodiments, the present disclosure provides methods of making surface coverings, for example, rubber mats, rolled rubber, molded rubber tile, etc. Implementations of methods of the present disclosure are useful for making a wide range of surface covering, including but not limited to: flooring, walls, countertops, furniture, etc., for example in commercial or industrial sites, sporting venues, gyms, laundry areas, and a variety of other residential applications. In some embodiments, the present disclosure also provides surface coverings made methods as disclosed herein.

In some embodiments, the present disclosure provides methods of making surface coverings that are characterized in that they are no-wax. In some embodiments, the present disclosure provides methods of making surface coverings that do not require initial maintenance.

In some embodiments, the present disclosure provides methods of making surface coverings that are particularly resistant to soiling even after prolonged normal use. In some embodiments, the present disclosure provides methods of making surface coverings that are characterized by their ability to be cleaned with water (and/or a mild detergent) and wiping, such as wet mopping. In some embodiments, the present methods include forming a surface covering that is cleanable, such that when such an exposed surface is wiped with water, any dirt, debris, particles, and/or soil present are substantially removed.

In some embodiments, methods include forming a surface covering include a making a surface covering that is characterized in that after a rotary cleaning machine having standard red or green scouring pads operates on an exposed surface of a surface covering, a no-wax surface at 300 rpm for 2 minutes, an exposed surface is substantially free of soiling.

In some embodiments, the present disclosure provides methods of making surface coverings that are characterized in that they are resilient to various forms of exposure, mechanical wear and/or damage, for example, scratches, scuffs, abrasions, dents, mars, fading (e.g. color fading), heat, or combinations thereof, for example, even after prolonged normal use. In some embodiments, the present disclosure provides methods of making surface coverings that are characterized by their resistance to abrasion, cracks, dents, fading (e.g. color fading), mars, peeling, scuffing, scratching, and/or wear, for example, even after prolonged normal or extreme use. In some embodiments, the present disclosure provides methods of making surface coverings that are substantially free of abrasion, cracking, dents, fading, scuffing, scratching, mars, peeling, and/or wear following exposure.

In some embodiments, the present disclosure provides methods of making surface coverings that are flexible. In some embodiments, the present disclosure provides methods of making surface coverings that are abrasion resistant while achieving and/or maintaining desired flexibility.

In some embodiments, the present disclosure provides methods of making surface coverings that are resistant to breaking, bubbling, buckling, or crumbling. In some embodiments, the present disclosure provides methods of making surface coverings that are resistant to breaking, bubbling, buckling, or crumbling when exposed to downward and lateral compression. In some embodiments, the present disclosure provides methods of making surface coverings that are resistant to crumbling or buckling while achieving and/or maintaining desired flexibility. In some embodiments, the present disclosure provides methods of making surface coverings that are resistant to crumbling or buckling while achieving and/or maintaining desired flexibility and abrasion resistance.

In some embodiments, methods include providing a base comprising a rubber material; flame treating a portion of the base; and applying a protective coating to at least one flame treated surface of the portion of the base.

In some embodiments, provided methods of manufacturing include providing a base, preparing a base for a protective coat, and applying a protective coat.

In some embodiments, methods of manufacturing include a step of providing of a base. In some embodiments, a base is or includes a rubber material.

In some embodiments, methods of providing a base include forming a base that is or includes a rubber material. In some embodiments, methods of forming a base include blending or combining base components is done in a mixer. In some embodiments, methods for forming a base includes blending components of a base, for example, a rubber material, a tackifier, a filler, additives, flow agents, pigments, and/or stabilizers.

In some embodiments, methods of forming a base includes blending components is in a mixer. In some embodiments, blending is at an elevated temperature. In some embodiments, an elevated temperature is: at least about 75° F., at least about 100° F., at least about 150° F., at least about 175° F., at least about 200° F., at least about 225° F., at least about 250° F., at least about 275° F., at least about 300° F., at least about 325° F., at least about 350° F., at least about 375° F., at least about 400° F., at least about 425° F., at least about 450° F., at least about 475° F., or at least about 500° F.

In some embodiments, methods of forming a base further includes a step of calendering uncured mixed raw materials into a web.

In some embodiments, methods of forming a base further includes a step of rolling a sheet out of a web. In some embodiments, methods of providing a base further include forming a sheet out of a web that is sized according to its use.

In some embodiments, methods of forming a base further includes a step of punching a tile shape out of a web. In some embodiments, methods of providing a base further include a step of punching a section out of a web. In some embodiments, a punched section has a desired shape. In some embodiments, methods of providing a base further include a step of punching a tile out of a web. In some embodiments, methods of providing a base further include forming a design or pattern therein or thereon.

In some embodiments, methods of forming a base further includes a step of molding a tile shape out of a web. In some embodiments, a step of providing a base includes a step of molding a rubber material. In some embodiments, a step of providing a base includes a step of molding a rubber material into a tile. In some embodiments, a step of providing a base includes a step of embossing or depressing a rubber material. In some embodiments, a step of providing a base includes a step of rounding a rubber material. In some embodiments, a step of providing a base includes a step of beveling a rubber material.

In some embodiments, a release agent is not utilized. In some embodiments, a release agent is utilized. In some embodiments, a release agent is utilized when a surface covering is a molded tile. In some embodiments, methods do not include a step of providing, applying or using a release agent. A release agent is a composition applied to a mold prior to placing and/or applying pressure of an uncured rubber material on the mold, so that a cured rubber material can be easily removed from the mold after curing. Release agents, for example, include silicone.

In some embodiments, methods of forming a base further includes a step of cooling a base from an elevated temperature.

In some embodiments, provided methods include preparing a base. In some embodiments, provided methods include cleaning and flame treating a base.

In some embodiments, provided methods include cleaning a base. In some embodiments, provided methods include cleaning a base with a detergent and/or detergent solution. In some embodiments, provided methods include cleaning an exposed surface of a base with a detergent and/or detergent solution. In some embodiments, a detergent and/or detergent solution is or comprises soap and water. In some embodiments, a detergent and/or detergent solution is a pH neutral detergent. In some embodiments, a detergent and/or detergent solution is a pH up to 12. In some embodiments, a detergent and/or detergent solution is any surface preparing solution known in the art. In some embodiments, a detergent solution is washed with about 1 gpm to about 25 gpm to clean. In some embodiments, a solution is under pressure.

In some embodiments, provided methods of cleaning include, for example abrading, scouring, scrubbing, and/or washing. In some embodiments, provided methods of cleaning include, for example abrading, scouring, scrubbing, and/or washing a portion of a base for a period. In some embodiments, provided methods include cleaning includes abrading scouring, scrubbing, and/or washing a portion of a base with a tool. In some embodiments, cleaning tool, for example, is a brush, rag, or scouring pad.

In some embodiments, a cleaned base is dried or is permitted to dry. In some embodiments, drying is or comprises exposing a cleaned base to a desiccant. In some embodiments, a step of drying includes exposing a surface of a base to a gas. In some embodiments, a gas is dry air. In some embodiments, a gas is or includes an inert gas, such as nitrogen. In some embodiments, exposing a surface of a base to a gas. In some embodiments, a jet provides a gas at a higher pressure. In some embodiments, blower output is about 500 cfm to about 1500 cfm.

In some embodiments, provided methods include flame treating a base. In some embodiments, provided methods include flame treating a cleaned surface of a base.

Prior to the present disclosure, various processes have been investigated for their usefulness in preparing a rubber surface for a coating, for example corona process or flame treatment, etc. Until the present disclosure, such techniques were not successful in producing a surface covering where an exposed surface of a surface covering is a no-wax surface.

Rubber materials are typically activated before their surface will accept a coating, such as adhesives, inks, paints, or protective coats. Techniques and methods such as a corona process and flame treating were utilized to improve adhesion. Surface activation of such rubber materials is known to improve wettability and adherence of such coatings thereto. Mechanisms of surface activation include, for example, exposing a surface of a rubber material to a plasma, electric discharge, high temperature, or chemical. Activation occurs in several steps on a surface of a rubber material that causes breaking C—H bonds followed by bonding of an oxygen-based group in its place. Such an oxidation process forms newly available hydrophilic interaction sites affecting and thereby improving both wettability and adhesion properties of rubber material based bases or substrates. A surface of a rubber material that was activated prior to application of a coating, typically would show improved adhesion of adhesives, inks, paints, etc.

Corona process, for example, has been widely used as a surface treatment of thermoplastic materials in the flooring market, namely to prepare large rolls of very thin plastic sheets for ink printing, for example in the packaging industry. Corona process however has severe limitations such that it is generally not used with rubber materials, and rubber tiles in particular. Corona and similar discharge system require tight specifications for tolerance of thickness and flatness for sheets into the machine and height of surface embossing/texture. Such limitations are more problematic for tile formats by creating uncontrolled discharges throughout the surface of the material, and therefore uneven/unacceptable surface preparation.

Flame treatment, for example, has also been used as a surface treatment of rubber materials. Flame treating activates a base by increasing tension of a surface of a base by exposing it to a certain amount of thermal energy. But, flame treatment exhibits severe limitations of its own. To activate a surface, flame treatment requires extreme temperatures, such that prior flame treating processes are generally considered incompatible with surface coverings as provided herein.

However, in some embodiments, heat required is incompatible for activation of provided bases and protective coatings because rubber materials, for example, do not favorably respond to high temperatures and/or exposure times. In some embodiments, for example, colored rubber materials in a base would discolor (e.g. turn brown) or burn. By contrast, typical flame treatment processes included flash operation, fast operating speeds, and/or wide gap distances, such that thermoplastics would not melt, burn, or degrade.

Moreover in some embodiments, a delay in applying a protective coat after activation of a base can for example cause its deactivation resulting in poor adhesion. In some embodiments, a delay for example can result in contamination causing poor adhesion.

Additionally, among other thing, to avoid delay, contamination, and/or excess mechanical handling of a base having an activated surface, manufacturing places application of a protective coat in line after flame treating. But, rates of process for steps of flame treating, cooling, applying a protective coat and/or curing do not correspond. In additional to the above described challenges, if application of a protective coat follows too soon after a flame treatment step, a protective coat does not adhere or will crack or will show reduced abrasion resistance.

The present disclosure encompasses a recognition that traditional processes of surface activation were generally considered inadequate when used with surface coverings as provided herein, that is for example, rubber flooring materials and protective coatings for products that experience high use or traffic. Traditional rubber materials including, for example, rubber flooring materials coated with a protective coating following surface activation showed cracking, peeling, scuffing and scratching with normal use.

In some embodiments, methods including a step of flame treating that is or includes heat of about 250,000 BTU/hour to about 750,000 BTU/hour.

In some embodiments, a step of flame treating is or includes: a fuel, a gas, an oxidative gas, a gas:fuel ratio, a flame shape, a flame temperature, a gap defining a distance between a flame and a surface of a base, an exposure time, etc.

In some embodiments, a step of flame treating is or includes a gas, for example air or oxygen, and a fuel, natural gas or propane.

In some embodiments, a step of flame treating is or includes a gas:fuel ratio of about 10:1.

In some embodiments, methods including a step of flame treating includes a flame having a shape characterized by burner nozzle geometry and configuration.

In some embodiments, methods including a step of flame treating include a flame having a temperature of about 1700° C. for natural gas and 1900 to 2000° C. for propane.

In some embodiments, methods including a step of flame treating that includes a gap defining a distance between a flame and a surface of a base of about 0.5 inch to about 3.2 inches. In some embodiments, a gap between a flame and a surface of a base is a distance between a tip of a luminous flame cone and a surface of a rubber material.

In some embodiments, methods including a step of flame treating include a flame exposure time of about 0.03 seconds to about 0.15 seconds.

In some embodiments, methods including a step of flame treating include a number of sequential treatments. In some embodiments, a number of sequential treatments is at least one. In some embodiments, a number of sequential treatments is two.

In some embodiments, methods including a step of flame treating include a line speed. In some embodiments, a line speed is at least about 15 ft/min to about 80 ft/min.

In some embodiments, above conditions and/or a number of sequential treatments varies with surface topography.

In some embodiments, provided methods include applying a protective coat as disclosed herein. In some embodiments, provided methods include applying a protective coat as disclosed herein. In some embodiments, applying is or includes manually applying, coating, spraying, roll coating, etc. In some embodiments, a step of applying includes for example roll coating. In some embodiments, a step of roll coating utilizes a roll coater. In some embodiments, methods of applying a protective coat includes roll coating. Although, any methods for application known to those skilled in the art may be employed.

In some embodiments, methods of manufacturing surface coverings as provided includes cross-linking (e.g., oxidative cross-linking) the detergent cleaned and flame treated surface of a rubber material with a protective coat.

In some embodiments, a step of applying is characterized in that the protective coat adheres to at least one flame treated surface of a base. In some embodiments, a step of applying is characterized in that the protective coat adheres to at least one flame treated surface of a portion of a base. In some embodiments, methods include forming an exposed surface of a surface covering, a no-wax surface on a base.

In some embodiments, methods of applying a protective coat includes a step of curing.

In some embodiments, a curing step is an active step. In some embodiments, an active curing step includes UV curing, e-beam curing, and/or curing with an elevated temperature. In some embodiments, an active cure uses about 12 KW to about 48 KW of power to cure.

In some embodiments, the curing step is a passive cure.

In some embodiments, methods do not include a step of providing, applying or using an adhesion promoter. Adhesion promoters, for example, include chlorinated polyolefin. In some embodiments, an adhesion promoter is not utilized with application of a protective coat.

In some embodiments, a surface of a surface covering having a base that is detergent cleaned and flame treated prior to application of a protective coat is characterized it is resistant to abrasion, dents, fading (e.g. color fading), scuffing, scratching, mars, and/or wear, for example, even after prolonged normal use.

EXEMPLIFICATION

The following examples illustrate some embodiments and aspects of the invention. It will be apparent to those skilled in the relevant art that various modifications, additions, substitutions, and the like can be performed without altering the spirit or scope of the invention, and such modifications and variations are encompassed within the scope of the invention as defined in the claims which follow. The following examples do not in any way limit the invention.

Example 1

The present example describes preparation of a surface covering in accordance with the present disclosure.

Figure 2:
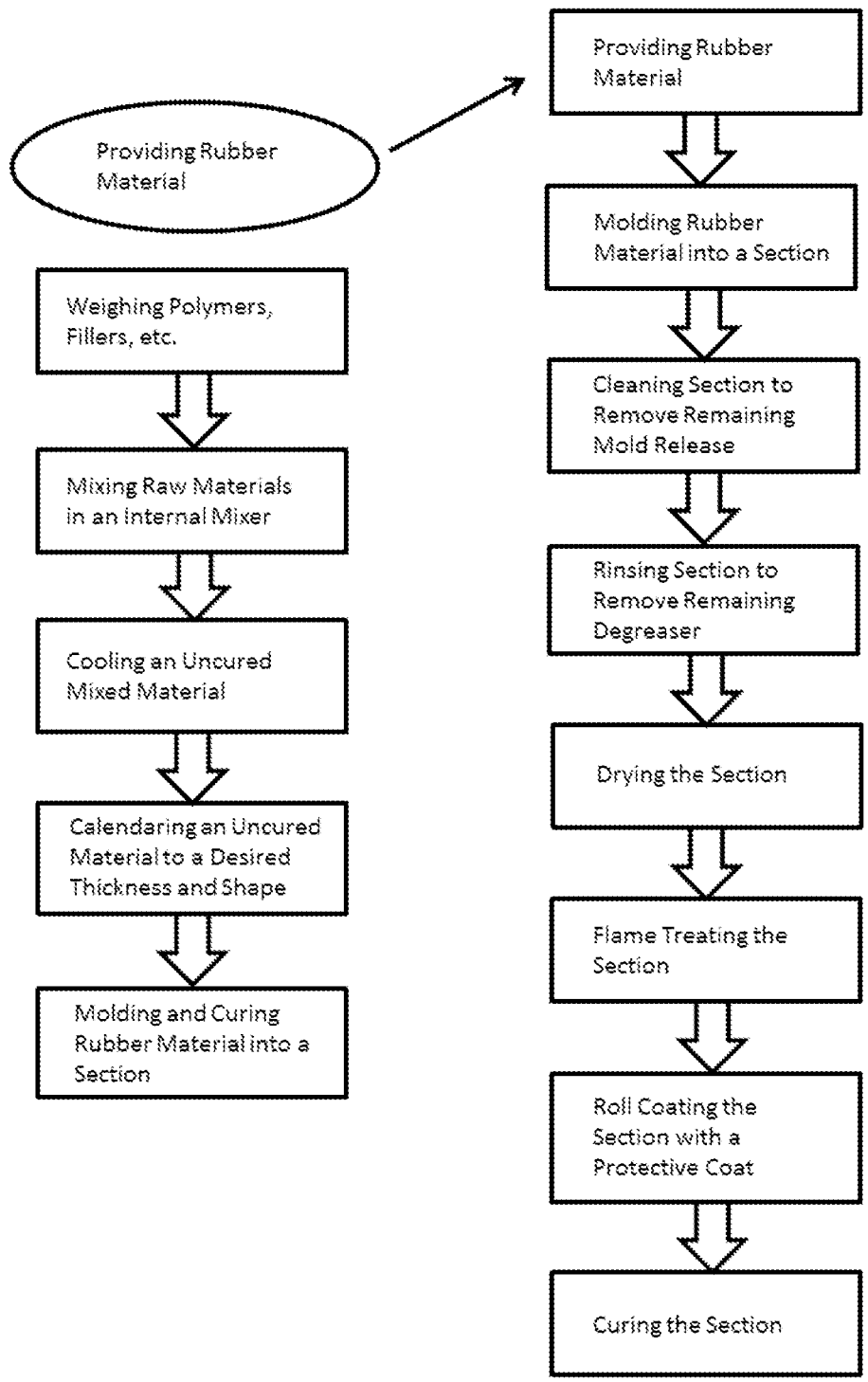
FIG. 2 shows a process of manufacturing a surface covering according to some embodiments.
Figure 3:
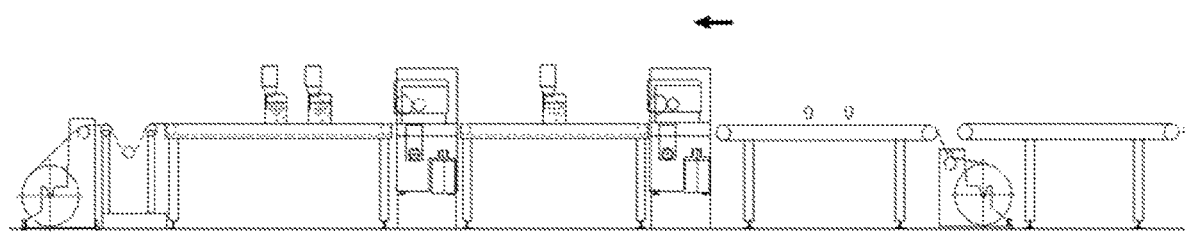
FIG. 3 shows a system or portion thereof for manufacturing a surface covering according to some embodiments.
Figure 4:
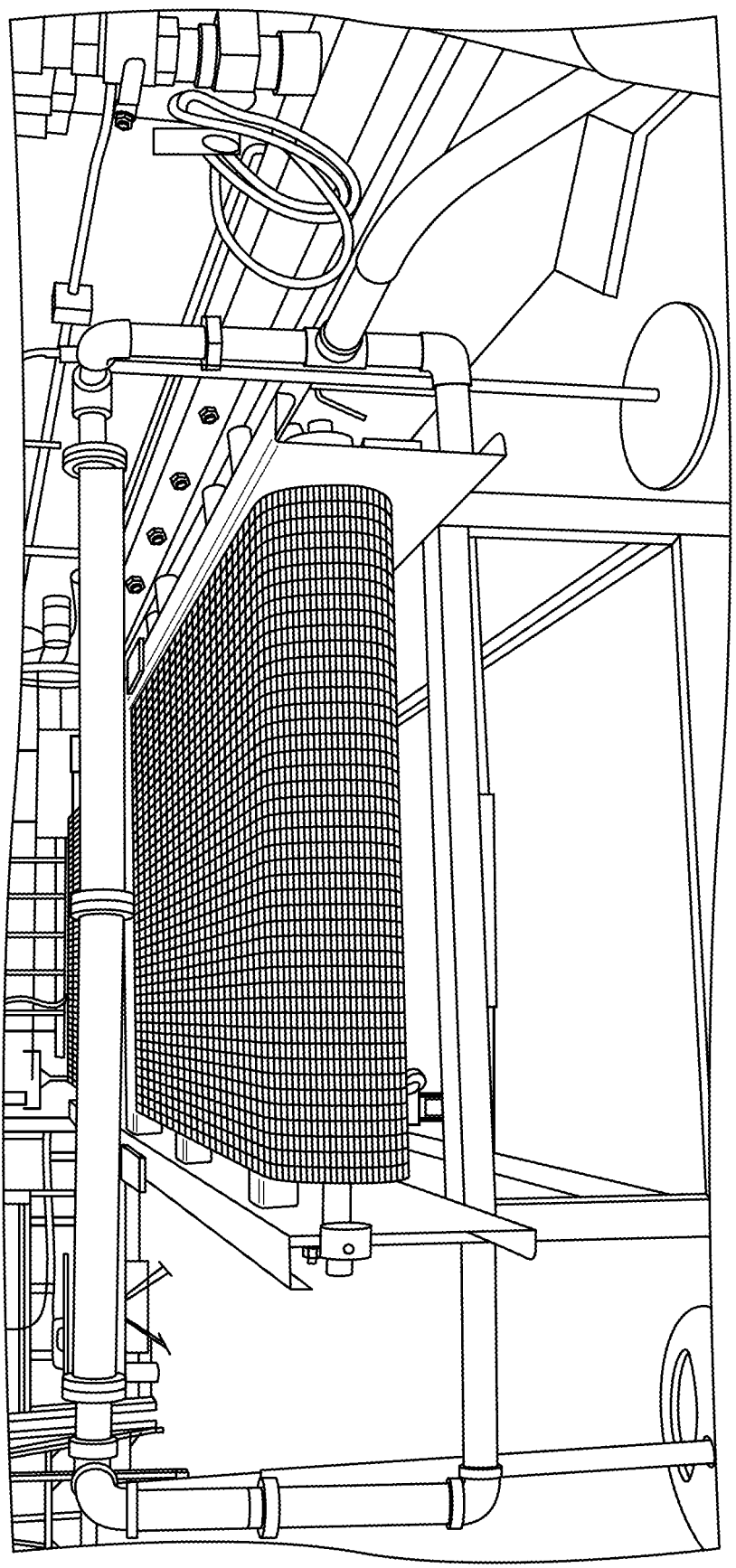
FIG. 4 shows a flame treating assembly of a system for manufacturing a surface covering according to some embodiments.
Figure 5:
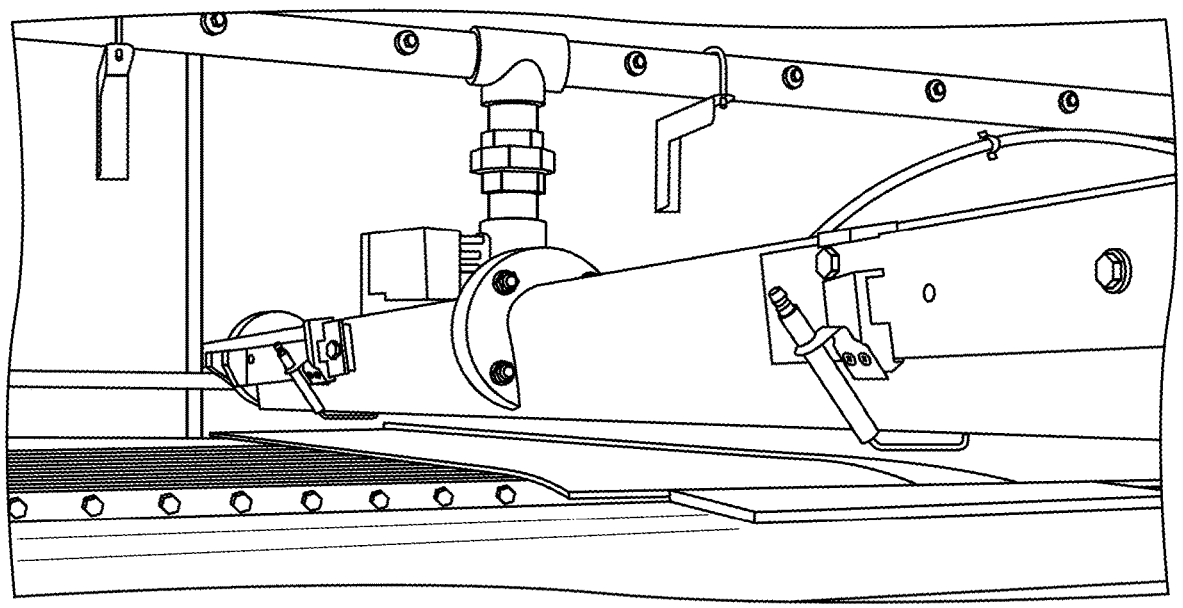
FIG. 5 shows a flame treating assembly of a system for manufacturing a surface covering according to some embodiments.

Surface coverings include a base having a protective coat adhered thereto were formed. FIG. 2 shows a process flow in accordance is some embodiments provided herein. Formed surface coverings are characterized in that they are no-wax.

A base of a surface covering comprising the combination of materials shown in Table 1 was manufactured and used in the Examples.

TABLE 1

| Base Composition | |
|---|---|
| Material | wt % |
| Functionalized polyolefin blend | 25% |
| Calcium carbonate | 50% |
| Post industrial recycled filler | 10% |
| Fire protection chemicals | 5% |
| Processing aids, pigments, curing system | 10% |

Components were melt blended in a Banbury mixer at 250-300° F. and cooled down; this was followed by calandering the material into a web. The web was either rolled in jumbo rolls, or cut into tiles. The base gauge was about 3 mm. Punched tiles were molded using compression presses. Tile size was 3'×3'.

The present example provides flame treating conditions for molded section or tile surface coverings manufactured in accordance with the present disclosure.

A protective coat used is or includes a blend of a polyurethane and a polyacrylic. A protective coat was then applied with a roll coater at 20 to 30 g/m² and a thickness of 15 to 25 microns. The applied protective coat was then UV cured at 800 to 1000 mJ/cm² and 400 to 600 mW/cm² in the UVA range.

FIG. 1 shows a cross-sectional view of a surface covering as disclosed here and in accordance with the present disclosure. A surface covering 100 includes a base 110 and a protective coat 130 applied on top of a base having an interface 120 therebetween. While the base 110 is shown in FIG. 1 as having a significantly greater thickness than the other materials of the article 100, it should be appreciated that a base thickness may be any desired thickness. A relative dimensions shown in FIG. 1 are not intended to be limiting. Preferably, however, a thickness of a base 110 is such that it provides structural rigidity to a surface covering. More preferably, a thickness of a base 110 is approximately 50-200 mils. A preferred thickness for an entire surface covering article 100 is approximately 3 mm.

Example 2

The present example provides flame treating conditions for tile surface coverings manufactured in accordance with the present disclosure.

Table 2 provides a range of flame treating conditions used in forming surface coverings as provided herein.

TABLE 2

| | Flame Treating Conditions | | | | | |
|---|---|---|---|---|---|---|
| | | | | | Surface Tension (Dynes) | |
| | Line | Power/ | Burner | Surface Temper- | | |
| Product | Speed m/min. | Energy BTU/po/hr | height inch | ature ° C. | pass 1 | pass 2 |
| sheet (roll), smooth design 2 mm | 5 20 | 9167 11,000 | 1 1¼ | 90-100 | 60 N/A | N/A 60 |
| tile, round stud design 3 mm | 5 20 | 9167 11,000 | 1 1¼ | 60-80 | 46-58 40-46 | N/A 60 |
| tile, slate design 3 mm | 5 20 | 9167 11,000 | 1 1¼ | 60-80 | 50-60 30-32 | N/A 60 |
| tile, smooth design 3 mm | 5 20 | 9167 11,000 | 1 1¼ | 60-80 36-40 | 50-60 38-42 | N/A 60 |
| tile, hammered design 3 mm | 5 20 | 9167 11,000 | 1 1¼ | | 60 46 | N/A 60 |
| tile, hammered design 2 mm | 5 20 | 9167 11,000 | 1 1¼ | 80-90 | 36-38 52 | N/A 60 |

Figure 6:
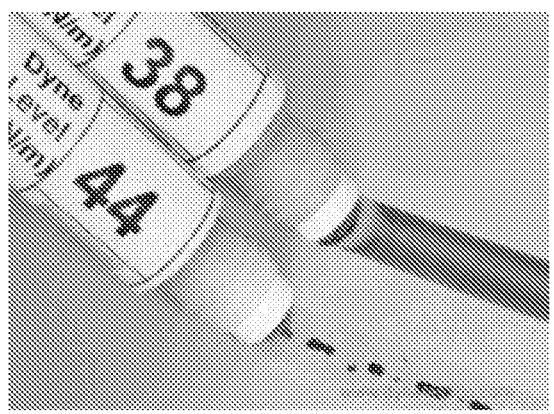
FIG. 6 shows surface tension results of surface coverings as provided in some embodiments.
Figure 7:
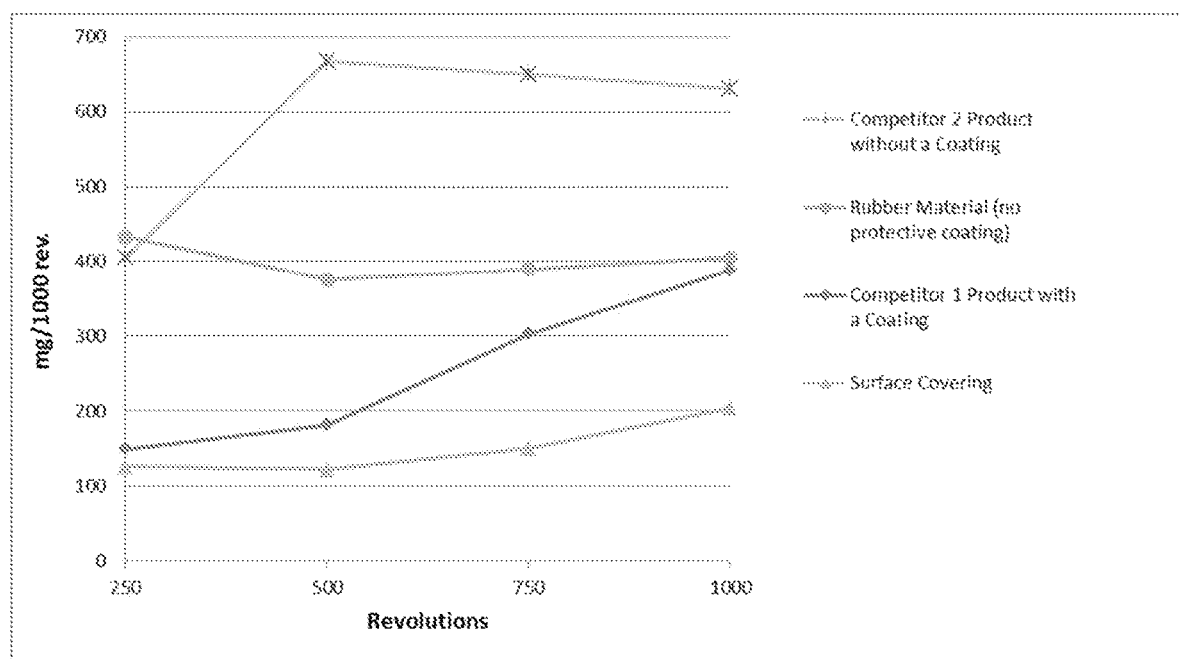
FIG. 7 shows a graph exhibiting Taber Abrasion results of surface coverings as provided in some embodiments.

Surface tension level is measured using calibrated Dynes pens. A higher number where the ink is wetting the surface, better will be the adhesion with the coating. Calibrated Dynes pens contact a surface of a surface covering after detergent and flame treatment. At least 50 Dynes ensure a good adhesion. FIG. 6 shows a 44 Dyne pen that does not exhibit good adhesion with a surface and a 38 Dyne pen that exhibits good adhesion with a surface.

Example 3

The present example compares end-use performance for tiles manufactured using traditional materials and method with surface coverings in accordance with the present disclosure. Unless noted otherwise, evaluated surface coverings were made in accordance with Examples 1 and 2.

Table 3 shows a maintenance/cleanability/abrasion test for surface coverings provided in Examples 1 and 2. Surface coverings as provided herein exhibit uniquely high cleanability and abrasion resistance. The pad description (3M Scotch Brite) include a red pad, which is a scouring cleaning pad used for daily maintenance; a green pad, which is a scouring cleaning pad, more aggressive than red scouring pad used for heavier maintenance cleaning; and a black pad, which is very aggressive/abrasive not recommended of typically used with floor maintenance.

TABLE 3

| | Maintenance/Cleanability/Abrasion Resistance | | |
|---|---|---|---|
| | Provided Surface Coverings | Competitor 1 with Coating | Competitor 2 without Coating |
| Initial (0 cycle; total 0) | easy to clean no soil visible on the surface | easy to clean no soil visible on the surface | easy to clean no soil visible on the surface |
| Red pad (3 cycle; total 3) | easy to clean no soil visible on the surface | easy to clean no soil visible on the surface | lightly visible soiled surface |
| Stripper (1 cycle; total 4) | easy to clean no soil visible on the surface | easy to clean no soil visible on the surface | lightly visible soiled surface |
| Green pad (10 cycle; total 14) | easy to clean no soil visible on the surface | easy to clean no soil visible on the surface | visibly soiled surface |
| Green pad (6 cycle; total 20) | easy to clean no soil visible on the surface | easy to clean no soil visible on the surface | visibly soiled surface |
| Black pad (1 cycle; total 21) | easy to clean no soil visible on the surface | worn out hard to clean, soiled surface still visible | visibly soiled surface |

Figure 8:
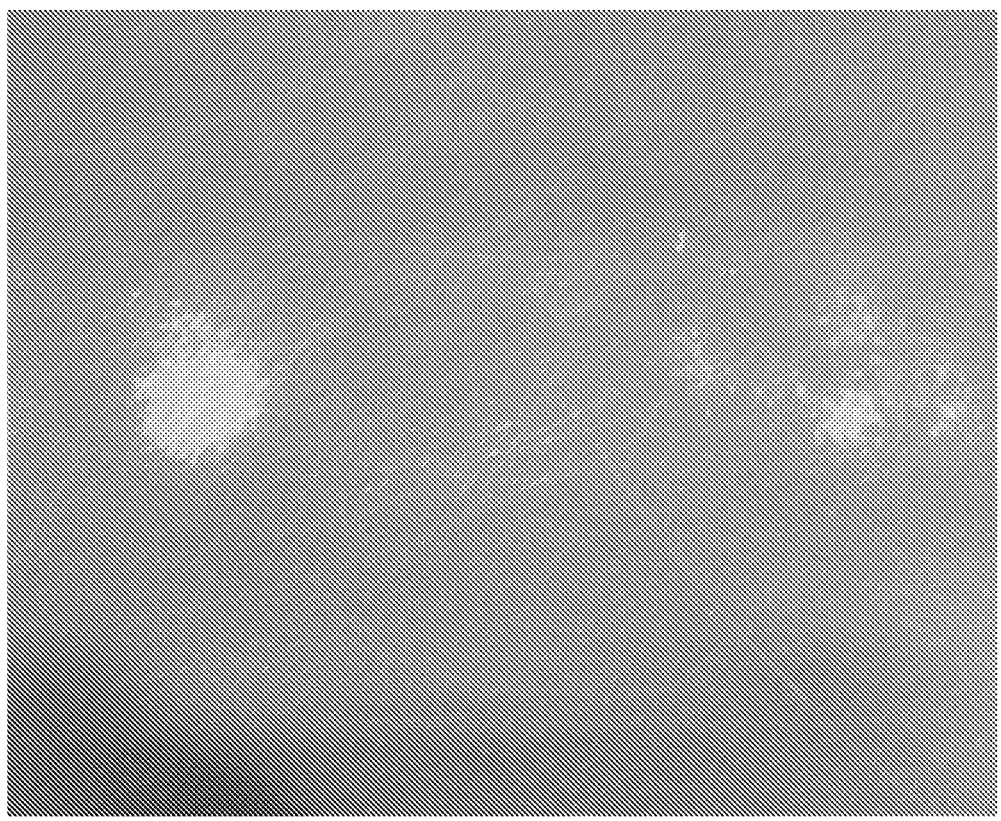
FIG. 8 shows results of an abrasion test using a rotary cleaning machine with a traditionally processed coated rubber flooring product.

FIG. 8 shows a surface of a commercial rubber floor with a coating that is made or processed according to traditional methods and exposed to the maintenance/cleanability/abrasion test of Table 3. From the image, wear of the coating and the flooring surface underneath the coating is clearly visible following exposure to a black abrasive pad.

Figure 9:
FIG. 9 shows results of an abrasion test using a rotary cleaning machine with a surface covering as provided in some embodiments.
Figure 9:

FIG. 9 at panels (a) and (b) show surface coverings as provided according to some embodiments herein and exposed to the maintenance/cleanability/abrasion test of Table 3. From the image, wear of surface coverings is not visible following exposure to a black abrasive pad.

Figure 11:
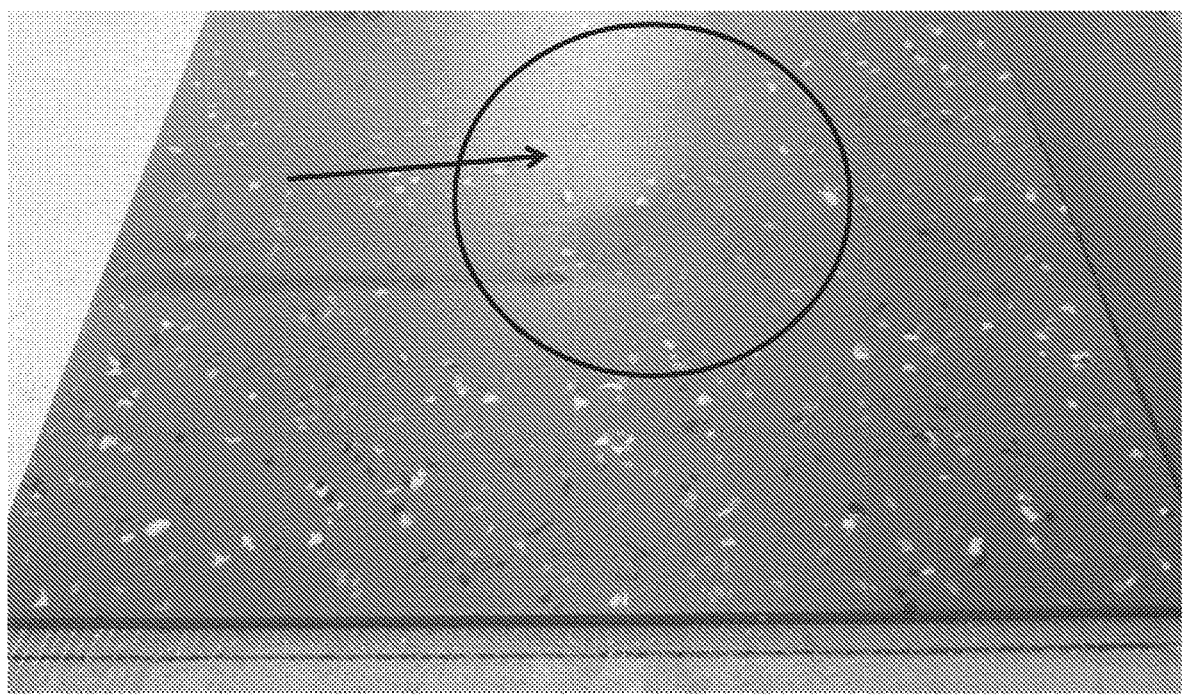
FIG. 11 shows results of a flexibility and wear test using a weighted hospital bed caster for a surface covering as provided in some embodiments.

The Taber abrasion test abraded a sample with a carborundum wheel (H22) for a given number of cycles or revolutions; the sample is weighted at the beginning of the test, and weighted again after 250 revolutions; the mass loss is reported as mg per 1000 revolutions; the same sample is abraded for another 250 revolutions, and the mass loss is calculated and reported the same way; this is repeated until the end of the test. The lower the mass loss, the better the abrasion resistance. FIG. 11. shows results for the Taber Abrasion test. Surface coverings as provided exhibited the lowest mass loss.

Surface coverings as provided herein are flexible. Table 4 show the results of a flexibility test using a mandrel according to ASTM F137 for a 3 mm thick samples.

In some embodiments, surface coverings as provided herein are resilient to compression. In some embodiments, a no-wax surface of provided surface coverings is resilient to cracking. In some embodiments, surface coverings are flexible and resilient to compression and their non-wax surface is resilient to cracking.

TABLE 4

| | Mandrel Test | | | | | | | |
|---|---|---|---|---|---|---|---|---|
| | Mandrel Diameter | | | | | | | |
| Sample | 3"½ 3.50" | 2"⅜ 2.375" | 1"15/16 1.90" | 1"11/16 1.67" | 1"5/16 1.32" | 1" 1.00" | ¾" 0.75" | 9/16" 0.56" |
| Provided Surface Coverings | OK | OK | OK | OK | OK | OK | light cracks (lens) | Cracks Naked eye |
| Competitor 1 with coating | OK | OK | OK | OK | OK | OK | OK | light cracks (lens) |
| Competitor 2 without coating | OK | OK | OK | OK | OK | OK | light cracks (lens) | Cracks Naked eye almost broken |

Figure 12:
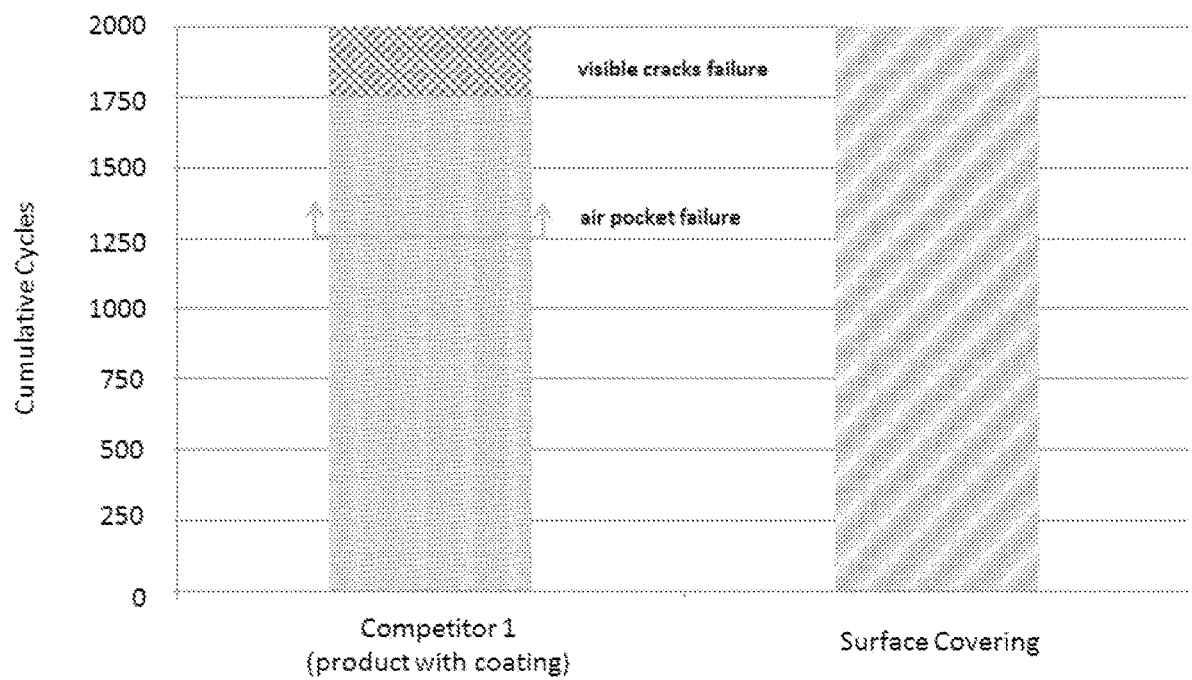
FIG. 12 shows results of a rolling load resistance test.

In some embodiments, surface coverings as provided herein are resilient to compression. In some embodiments, surface coverings are resilient to compression with downward and lateral movement. In some embodiments, surface coverings are characterized in that they are flexible when they do not buckle or bubble when exposed to a combined downward and lateral force. In some embodiments, a standard hospital bed caster holding at least 400 lbs is mounted on top of a no-wax surface of a surface covering, as provided herein. In some embodiments, such a caster is moved in a pattern traveling in a path pivoting on itself. In some embodiments, a caster follows such a pattern. In some embodiments, surface coverings as provided herein are resilient to such compression. In some embodiments, surface coverings as provided herein are substantially free of bubbles, buckles, cracks, tearing, and/or crumbling following 2000 cycles through such a pattern (FIG. 12).

Figure 10:
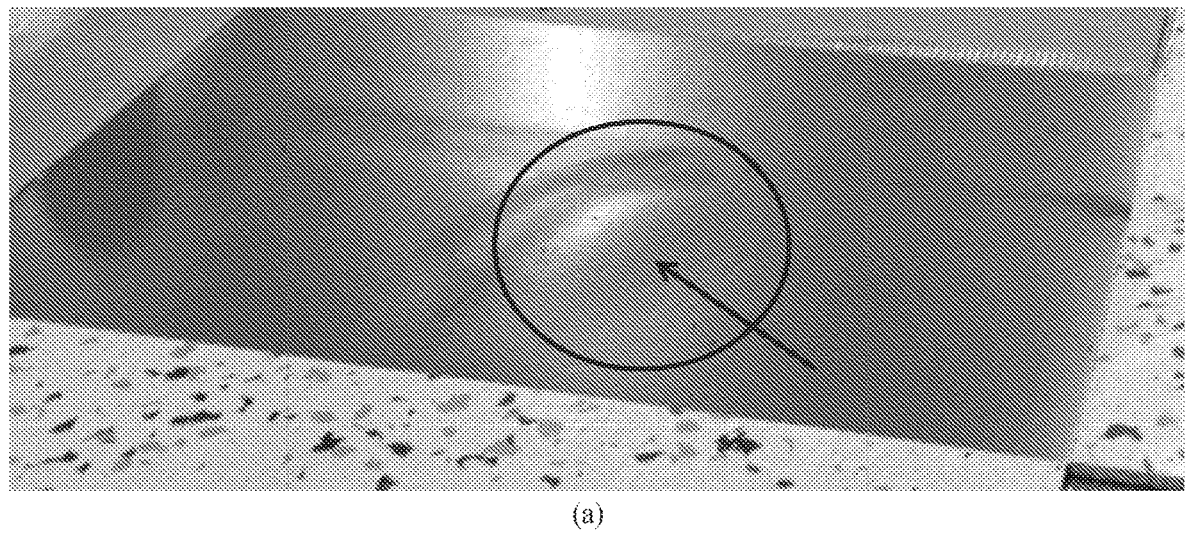
FIG. 10 shows results of a flexibility and wear test using a weighted hospital bed caster.
Figure 10:
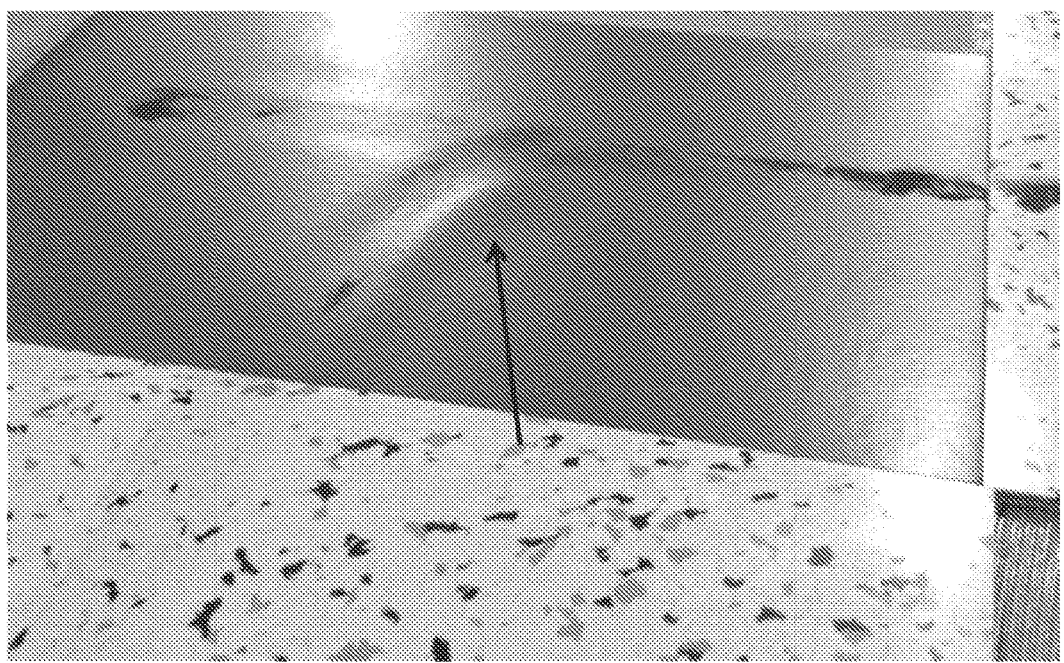

FIG. 10 at panels (a) and (b) show a surface of a commercial rubber floor with a coating that is made or processed according to traditional methods and exposed to the above rolling load resistance test. From the image, the flooring surface is not flexible such that bubbling and buckling of the flooring is clearly visible following exposure to the weighted hospital bed caster wheel.

FIG. 11 shows a surface of a surface covering as provided herein that was exposed to the above rolling load resistance test. From the image, the surface covering exhibits improved and desirable flexibility such that bubbling and buckling of the flooring is not visible following exposure to the weighted hospital bed caster wheel.

Table 5 shows scratch and stain test performed on surface coverings as provided herein.

TABLE 5

Stain and Scratch Resistance

|  | Provided Surface Coverings (scratch/stain) | Competitor 1 w/coating (scratch/stain) |
|---|---|---|
| Steel Wool |  |  |
| Fine #000 | 0/0 | 0/0 |
| Medium #1 | 0/0 | 0/0 |
| Coarse #3 | 0/0 | 2/0 |
| Scotch Brite | 0/0 | 4/3 |
| 10 lbs. Scratch Test |  |  |
| # of Cycles | 3000 | 250 |
| Rating | 2 | 5 |
| Total Score | 8 | 0 |
| Stain (2 hour) |  |  |
| Blue Sharpie Marker | 1.5 | 3 |
| Giemsa | 2.5 | 3 |
| Lugol's Stain | 3.0 | 3 |
| Betadine | 0.0 | 1 |
| Iodine | 3.0 | 3 |
| Wrights Stain | 2.0 | 3 |
| Potassium Permanganate | 3.0 | 3 |
| Kiwi Brown Shoe Polish | 1.0 | 2 |
| Oil Brown N Solution | 1.0 | 0 |
| Asphault | 0.0 | 0 |
| Mustard | 0.0 | 0.5 |
| Total | 17 | 21.5 |

References cited in the present disclosure are all hereby incorporated by reference in their entirety for all purposes herein.

Other Embodiments and Equivalents

While the present disclosures have been disclosed in conjunction with various embodiments, and examples, it is not intended that they be limited to such embodiments, or examples. On the contrary, the disclosures encompass various alternatives, modifications, and equivalents, as will be appreciated by those of skill in the art. Accordingly, the descriptions, methods and diagrams of should not be read as limited to the disclosed order of elements unless stated to that effect.

Although this disclosure has disclosed and illustrated certain embodiments, it is to be understood that the disclosure is not restricted to those particular embodiments. Rather, the disclosure includes all embodiments, that are functional and/or equivalents of the specific embodiments, and features that have been disclosed and illustrated. Moreover, the features of the particular examples and embodiments, may be used in any combination. The present disclosure therefore includes variations from the various examples and embodiments, disclosed herein, as will be apparent to one of skill in the art.

What is claimed is:

1. A surface covering, comprising:
   a cured rubber base,
      wherein the cured rubber base comprises a polyolefin-based elastomer that is blended with an ionomer;
   a protective coating adhered to at least a portion of the cured rubber base, which portion has been cleaned by abrading and has been flame treated in order to achieve a surface tension of at least 50 dynes/cm, forming a no-wax surface,
   wherein the flame treatment activates a contacted surface of the cured rubber base that has been abraded, and wherein the flame treatment is or comprises natural gas with air having an air:fuel ratio of about 10:1 and a burner nozzle to surface gap distance of about 0.5 inch to about 3.2 inches, and wherein the flame treatment is conducted at a line speed of about 5 m/min,
   wherein the protective coating is or comprises a material and/or composition selected from the group consisting of: a polyurethane and/or polyacrylic composition, or a blend or mix thereof,
   wherein the surface covering is characterized in that it is substantially free of a molding release agent,
   wherein the surface covering is flexible, such that it is substantially free of cracks when a mandrel of at least 1 inch OD is pressed onto the no-wax surface according to ASTM F137,
   wherein the no-wax surface is cleanable, such that when wiped with water, dirt, debris, and/or particles that are present on the no-wax surface are substantially removed,
   wherein the surface covering is characterized in that after a rotary cleaning machine operates on the no-wax surface for greater than 20 cycles at 300 rpm for at least 2 minutes per cycle, each cycle using a rotary cleaning machine having a standard red scouring pad, a stripper, a standard green scouring pad, or a black abrasive pad, the no-wax surface is substantially free of abrasion, mars, peeling, scuffing, scratching, and/or wear.

2. The surface covering of claim 1, wherein the surface covering is further characterized in that when a standard hospital bed caster holding at least 400 lbs is mounted on top of the no-wax surface and travels in a path pivoting on itself for a least 1000 cycles, the no-wax surface is substantially free of bubbles, cracks and crumbling.

3. The surface covering of claim 1, wherein the surface covering is a molded tile or a roll.

4. The surface covering of claim 1, wherein the cured rubber base further comprises one or more materials selected from the group consisting of: a butyl rubber; an ethylene-acrylic rubber; an ethylene-propylene rubber; an ethylene-propylene-diene rubber; a styrene-butadiene copolymer; polyisoprene; natural rubber; polybutadiene; polyisobutylene, and combinations, mixtures, or blends thereof.

5. The surface covering of claim 1, wherein the polyolefin-based elastomer has a density of about 0.8 g/cm³ to about 1.9 g/cm³.

6. The surface covering of claim 1, wherein the surface covering has at least one characteristic selected from the group consisting of:
an elongation of about 95% ASTM D412;
a tensile strength of about 6.2 MPa ASTM D412;
a tear strength of about 190 lb/in ASTM D624;
a Taber abrasion of less than about 150 mg per 1000 revolutions;
a Shore A hardness of about 95 ASTM D2240;
a thermal stability ΔE of less than about 5 ASTM F1514; and
a light stability ΔE of less than about 5 ASTM F1515.

7. The surface covering of claim 1, wherein the protective coating is a cured or curable protective coating.

8. The surface covering of claim 7, wherein the cured or curable protective coating is a UV cured or curable protective coating.

9. The surface covering of claim 1, wherein the protective coating has an application weight of about 15 g/m² to about 50 g/m².

10. The surface covering of claim 1, wherein the protective coating has a 60° gloss value of about 3 to about 40.

11. The surface covering of claim 1, wherein the protective coating is clear.

12. The surface covering of claim 1, further characterized by at least one of:
a Taber abrasion of less than about 150 mg per 1000 revolutions;
a ΔE of less than 5 following Xenon arc exposure for at least 400 hours; and
an average ΔE in a range of about 1 to about 5 when light resistance is measured by spectrophotometer after aging at the temperature of 145° F. for 300 hours.

13. The surface covering of claim 1, wherein the cured rubber base has a thickness of about 1.5 mm to about 5 mm.

14. The surface covering of claim 1, wherein a top surface of the cured rubber base is designed or comprises a design and/or texture.

15. The surface covering of claim 1, wherein the cured rubber base material further comprises a thermoplastic material that is or includes one or more materials selected from the group consisting of: a thermoplastic polyolefin; a thermoplastic polyurethane, a low-density polyethylene, a linear low-density polyethylene, an ultra-low density polyethylene; an ethylene methyl 3-methoxyacrylate copolymer, an ethylene methacrylic acid copolymer; an acrylate copolymer; an ethylene-octene copolymer; a styrene-acrylate copolymer; a styrene-methylacrylate block copolymer; a styrene-polyolefin block copolymer; a polystyrene, polyesters, polycarbonate, nylon, poly(methyl methacrylate), and combinations, mixtures, or blends thereof.

16. A method of making a surface covering, the method comprising steps of:
providing a base comprising a rubber material,
wherein the rubber material comprises a polyolefin-based elastomer that is blended with an ionomer;
molding and curing the rubber material;
treating a surface of the base to achieve a surface tension of at least 50 dynes/cm, wherein treating the surface comprises cleaning the cured rubber material to abrade the surface of the base and flame treating a portion of the base that has been abraded; and
applying a protective coating to at least one abraded and flame treated surface of the portion of the base,
wherein the protective coating is or comprises a material and/or composition selected from the group consisting of: a polyurethane and/or polyacrylic composition, or a blend or mix thereof,
wherein the step of flame treatment activates a contacted surface of the base that has been abraded, and wherein the step of flame treatment is or comprises natural gas with air having an air:fuel ratio of about 10:1 and a burner nozzle to surface gap distance of about 0.5 inch to about 3.2 inches, and wherein the flame treatment is conducted at a line speed of about 5 m/min,
wherein the surface covering is flexible, such that it is substantially free of cracks when a mandrel of at least 1 inch OD is pressed onto the no-wax surface according to ASTM F137,
wherein the protective coating adheres to the at least one flame treated and abraded surface of the portion of the base forming a no-wax surface, wherein the no-wax surface is cleanable, such that when wiped with water, dirt, debris, and/or particles that are present on the no-wax surface are substantially removed,
wherein the surface covering is characterized in that after a rotary cleaning machine operates on the no-wax surface for greater than 20 cycles at 300 rpm for at least 2 minutes per cycle, each cycle using a rotary cleaning machine having a standard red scouring pad, a stripper, a standard green scouring pad, or a black abrasive pad, the no-wax surface is substantially free of abrasion, mars, peeling, scuffing, scratching, and/or wear.

17. The method of claim 16, wherein the greater than 20 cycles comprises 21 cycles, including 3 cycles using a rotary cleaning machine having a standard red scouring pad, 1 cycle using a rotary cleaning machine having a stripper, 10 cycles using a rotary cleaning machine having a standard green scouring pad, 6 cycles using a rotary cleaning machine having a standard green scouring pad, and 1 cycle using after a rotary cleaning machine having a black abrasive pad.

18. The method of claim 17, wherein a blend of clay, carbon black, and pigments are ground into the no-wax surface before the rotary cleaning machine operates for 21 cycles.

19. The method of claim 16, wherein the providing step, is or comprises one or more steps of:
mixing the rubber material;
calendering the rubber material;
and cutting the rubber material to size.

20. The method of claim 16, wherein the molding step, is or comprises one or more steps of:
embossing the rubber material;
rounding the rubber material;
beveling the rubber material; and
depressing the rubber material.

21. The method of claim 16, wherein the cleaning step, comprises scouring, scrubbing, and/or washing the surface of the base.

22. The method of claim 16, wherein the cleaning step, comprises scouring, scrubbing, and/or washing the surface of the base with a detergent.

23. The method of claim 16, wherein prior to the step of flame treatment and after the cleaning step, the base is substantially free of release agents.

24. The method of claim 16, where in the base is characterized by a surface tension of less than 30 dyne/cm before cleaning.

25. The method of claim 16, wherein the applying step, comprises rolling or roll coating the protective coat.

26. The method of claim 16, wherein the applying step, comprises cross-linking an oxidized surface of the rubber material and the protective coating.

27. The method of claim 16, wherein the cured rubber material further comprises one or more materials selected from the group consisting of: a butyl rubber; an ethylene-acrylic rubber; an ethylene-propylene rubber; an ethylene-propylene-diene rubber; a styrene-butadiene copolymer; polyisoprene; natural rubber; polybutadiene; polyisobutylene, and combinations, mixtures, or blends thereof.

\* \* \* \* \*